(12) United States Patent
Funami

(10) Patent No.: US 12,179,285 B2
(45) Date of Patent: Dec. 31, 2024

(54) LASER PROCESSING METHOD AND LASER PROCESSING DEVICE AND SEALED TYPE BATTERY

(71) Applicant: Panasonic Intellectual Property Management Co., Ltd., Osaka (JP)

(72) Inventor: Koji Funami, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 567 days.

(21) Appl. No.: 17/367,276

(22) Filed: Jul. 2, 2021

(65) Prior Publication Data

US 2022/0040793 A1    Feb. 10, 2022

(30) Foreign Application Priority Data

Aug. 6, 2020    (JP) ................. 2020-134093

(51) Int. Cl.
*B23K 26/244*    (2014.01)
*B23K 26/00*    (2014.01)
(Continued)

(52) U.S. Cl.
CPC ........ *B23K 26/244* (2015.10); *B23K 26/0006* (2013.01); *B23K 26/0652* (2013.01);
(Continued)

(58) Field of Classification Search
None
See application file for complete search history.

(56) References Cited

U.S. PATENT DOCUMENTS

2011/0095003 A1    4/2011    Sakurai et al.
2011/0195288 A1*   8/2011    Harima ............ H01M 10/0431
                                                219/121.64
(Continued)

FOREIGN PATENT DOCUMENTS

CA    3055275 A1 *  9/2018   ......... B23K 26/0608
JP    58-074294      5/1983
(Continued)

OTHER PUBLICATIONS

Machine translation of KR-1020180044726-A, Jun. 2024 (Year: 2024).*

*Primary Examiner* — Geoffrey S Evans
(74) *Attorney, Agent, or Firm* — Rimon P.C.

(57) ABSTRACT

Provided is a laser processing method including overlapping a plurality of plate-shaped members that include a first plate-shaped member disposed on one end side of an overlapping direction and a second plate-shaped member disposed on the other end side of the overlapping direction; branching a laser beam into a first branched laser beam and a second branched laser beam; irradiating the first plate-shaped member with the first branched laser beam and the second branched laser beam in a state where the first branched laser beam and the second branched laser beam are emitted in parallel; forming line-shaped melting portions on the first plate-shaped member by moving the branched laser beams in a direction intersecting a direction in which the branched laser beams are aligned; and joining overlapped plate-shaped members in a state where the melting portion formed by using the first branched laser beam and the (Continued)

melting portion formed by using the second branched laser beam are connected to each other in the second plate-shaped member and the melting portions do not penetrate the second plate-shaped member.

3 Claims, 16 Drawing Sheets

(51) Int. Cl.
*B23K 26/06* (2014.01)
*B23K 26/067* (2006.01)
*B23K 26/08* (2014.01)
*B23K 26/32* (2014.01)
*G02B 27/10* (2006.01)
*G02B 27/42* (2006.01)
*H01M 50/536* (2021.01)
*B23K 103/12* (2006.01)

(52) U.S. Cl.
CPC ........ *B23K 26/067* (2013.01); *B23K 26/0676* (2013.01); *B23K 26/083* (2013.01); *B23K 26/32* (2013.01); *G02B 27/106* (2013.01); *G02B 27/4233* (2013.01); *H01M 50/536* (2021.01); *B23K 2103/12* (2018.08)

(56) References Cited

U.S. PATENT DOCUMENTS

| 2017/0141374 | A1 | 5/2017 | Nakai |
| 2018/0281111 | A1* | 10/2018 | Kassai ................ H01M 50/107 |
| 2020/0259133 | A1 | 8/2020 | Tominaga et al. |

FOREIGN PATENT DOCUMENTS

| JP | 2000-233289 | | 8/2000 |
| JP | 4547855 | B | 9/2010 |
| JP | 2011-092944 | | 5/2011 |
| JP | 2018-174059 | A | 11/2018 |
| JP | 2019-061949 | A | 4/2019 |
| JP | 6512474 | B | 5/2019 |
| KR | 20180044726 | A * | 5/2018 |
| WO | 2015/193986 | A1 | 12/2015 |
| WO | 2019/044265 | A1 | 3/2019 |

* cited by examiner

LASER PROCESSING METHOD AND LASER PROCESSING DEVICE AND SEALED TYPE BATTERY

BACKGROUND

1. Technical Field

The present disclosure relates to a laser processing method, a laser processing device, and a sealed type battery.

2. Description of the Related Art

In the related art, various laser processing methods are known. For example, as a laser processing method for welding a plurality of plate-shaped members to each other, a lap laser welding such as a spot welding, in which a welding is performed with one spot, and a line welding, in which continuous welding is performed in a linear shape or a curved shape, is known.

The laser welding is used, for example, in the manufacturing of sealed type batteries. In the recent manufacture of sealed type batteries, an outside of a battery outer case is irradiated with a laser beam, a melting portion is formed by laser irradiation in the battery outer case and a current collector tab, which is derived from a battery electrode, and a laser welding is performed (see, for example, Japanese Patent No. 4547855 and Japanese Patent No. 6512474). The sealed type battery manufactured in this way is used in electric tools, electric bicycles, electric motorcycles, or the like.

For example, in Japanese Patent No. 4547855, a battery outer case and a current collector tab are joined by a spot welding. FIG. 17A shows a cross-sectional view of a laser processing method in the related art described in Japanese Patent No. 4547855. FIG. 17B is a detailed cross-sectional view in which the vicinity of melting portion 13 is expanded, which is turned upside down for easy understanding. As shown in FIG. 17A, in a state where current collector tab 12 is overlapped on an inner surface of a bottom portion of battery outer case 5, an outside of the bottom portion of battery outer case 5 is irradiated with laser beam 21 and melting portion 13 is formed. Therefore, battery outer case 5 and current collector tab 12 are joined by the spot welding. As shown in FIG. 17B, the width of melting portion 13 in the horizontal direction on the drawing is larger as compared with the plate thickness of battery outer case 5. Therefore, the energy of laser beam 21 input to melting portion 13 becomes large, and the depth of melting portion 13 in the vertical direction on the drawing is easily affected by an output of laser beam 21. When the output of laser beam 21 is high, melting portion 13 easily penetrates current collector tab 12. When melting portion 13 penetrates current collector tab 12, spatter may be mixed inside battery outer case 5, and a battery short circuit failure may occur.

Further, for example, in Japanese Patent No. 6512474, in order to prevent the spatter mix as in Japanese Patent No. 4547855, the condensed light spot diameter is narrowed down to the plate thickness of battery outer case 5 or less by using a fiber laser having improved light-condensing properties. As shown in FIG. 18A, the penetration of current collector tab 12 can be prevented by forming elongated melting portion 13. However, since a joining width, which is a width of melting portion 13 at a boundary between current collector tab 12 and battery outer case 5, is narrowed, a joining strength between current collector tab 12 and battery outer case 5 is lowered. Therefore, as shown in FIG. 18B, a joining strength is improved by line welding battery outer case 5 and current collector tab 12 with three lines.

SUMMARY

A laser processing method according to one aspect of the present disclosure is configured as follows. A plurality of plate-shaped members that include a first plate-shaped member disposed on one end side in an overlapping direction and a second plate-shaped member disposed on the other end side, are overlapped. Subsequently, a laser beam is branched into a first branched laser beam and a second branched laser beam. Subsequently, the first plate-shaped member is irradiated with the first branched laser beam and the second branched laser beam in a state where the first branched laser beam and the second branched laser beam are emitted in parallel. Subsequently, line-shaped melting portions are formed along a surface of the first plate-shaped member by relatively moving the first branched laser beam and the second branched laser beam with respect to the first plate-shaped member in a direction intersecting a direction in which the first branched laser beam and the second branched laser beam are aligned. The melting portion formed by the first branched laser beam and the melting portion formed by the second branched laser beam are connected to each other in the second plate-shaped member and the melting portions do not penetrate the second plate-shaped member. Therefore, each of the overlapped plate-shaped members is joined with the line-shaped melting portions.

A laser processing device according to one aspect of the present disclosure includes a laser oscillator, a laser oscillation controller, a laser branching optical system, a laser processing optical system, a stage, a stage controller, and an overall controller. The laser oscillator performs irradiation of a laser beam. The laser oscillation controller controls an output of the laser beam. The laser branching optical system branches the laser beam into a plurality of branched laser beams. The laser processing optical system irradiates a first plate-shaped member, which is disposed on one end side of an overlapping direction, of overlapped plate-shaped members, which are irradiation targets and include the first plate-shaped member and a second plate-shaped member disposed on the other end side of the overlapping direction, with the branched laser beams, in a state where the branched laser beams are emitted in parallel from each other. The stage relatively moves the overlapped plate-shaped members with respect to the laser beam. The stage controller controls an operation of the stage. The overall controller synchronously controls the stage controller and the laser oscillation controller. Therefore, the overall controller controls the operation of the stage and the irradiation of the branched laser beam. As a result, the overall controller forms line-shaped melting portions along the first plate-shaped member by relatively moving the branched laser beams with respect to the first plate-shaped member in a direction intersecting a direction, in which the branched laser beams are aligned while irradiating the first plate-shaped member with the branched laser beams, and the melting portion formed by one branched laser beam and the melting portion formed by another branched laser beam are connected to each other in the second plate-shaped member, and the melting portions do not penetrate the second plate-shaped member.

A sealed type battery according to one aspect of the present disclosure has a battery outer case and a current collector tab that is overlapped on an inner surface of a bottom surface portion of the battery outer case and is joined to the battery outer case at a melting portion. The current collector tab enters an outer peripheral portion of the melting portion in the battery outer case.

DETAILED DESCRIPTION

Background to Present Disclosure

When using a line welding (see Japanese Patent No. 6512474) in the related art in the method for manufacturing a sealed type battery, a joining strength between a battery outer case and a current collector tab after a welding does not meet a target value (a value of joining strength that does not cause a joining detachment between the battery outer case and the current collector tab).

Specifically, when a sealed type battery and a sealed type battery unit (a battery pack constituted by a plurality of sealed type batteries), which are manufactured by using a laser welding in the related art, are dropped, a state of the battery does not meet a normal state (for example, a state where a device using the battery can perform a normal function). In various drop tests, when a battery is dropped under a predetermined condition, a battery outer case and a current collector tab are detached. In order to prevent such detachment, it is desirable to improve a joining strength as compared with the joining strength between the battery outer case and the current collector tab in the laser welding in the related art. For example, it is desirable to improve the joining strength to substantially 1.5 times that of in the related art.

Figure 1A:
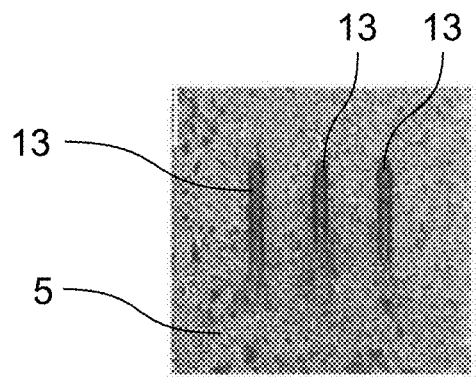
FIG. 1A is an explanatory view of a line welding with three lines in the related art.
Figure 1B:
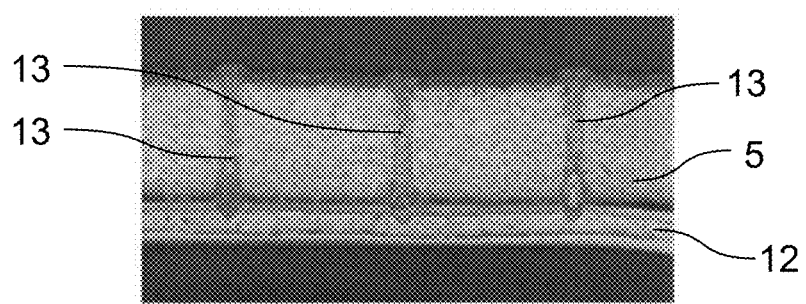
FIG. 1B is an explanatory view of a line welding with three lines in the related art.

FIGS. 1A and 1B show explanatory views of a line welding with three lines in the related art. As shown in FIG.

1A, as a method in the related art, a line welding with three lines is performed. As a result, three line-shaped melting portions 13 are formed along a surface of battery outer case 5.

As shown in the cross-sectional view of FIG. 1B, melting portion 13 penetrates battery outer case 5 and reaches current collector tab 12. Current collector tab 12 is made of a three-layered clad material (nickel/copper/nickel).

Figure 2:
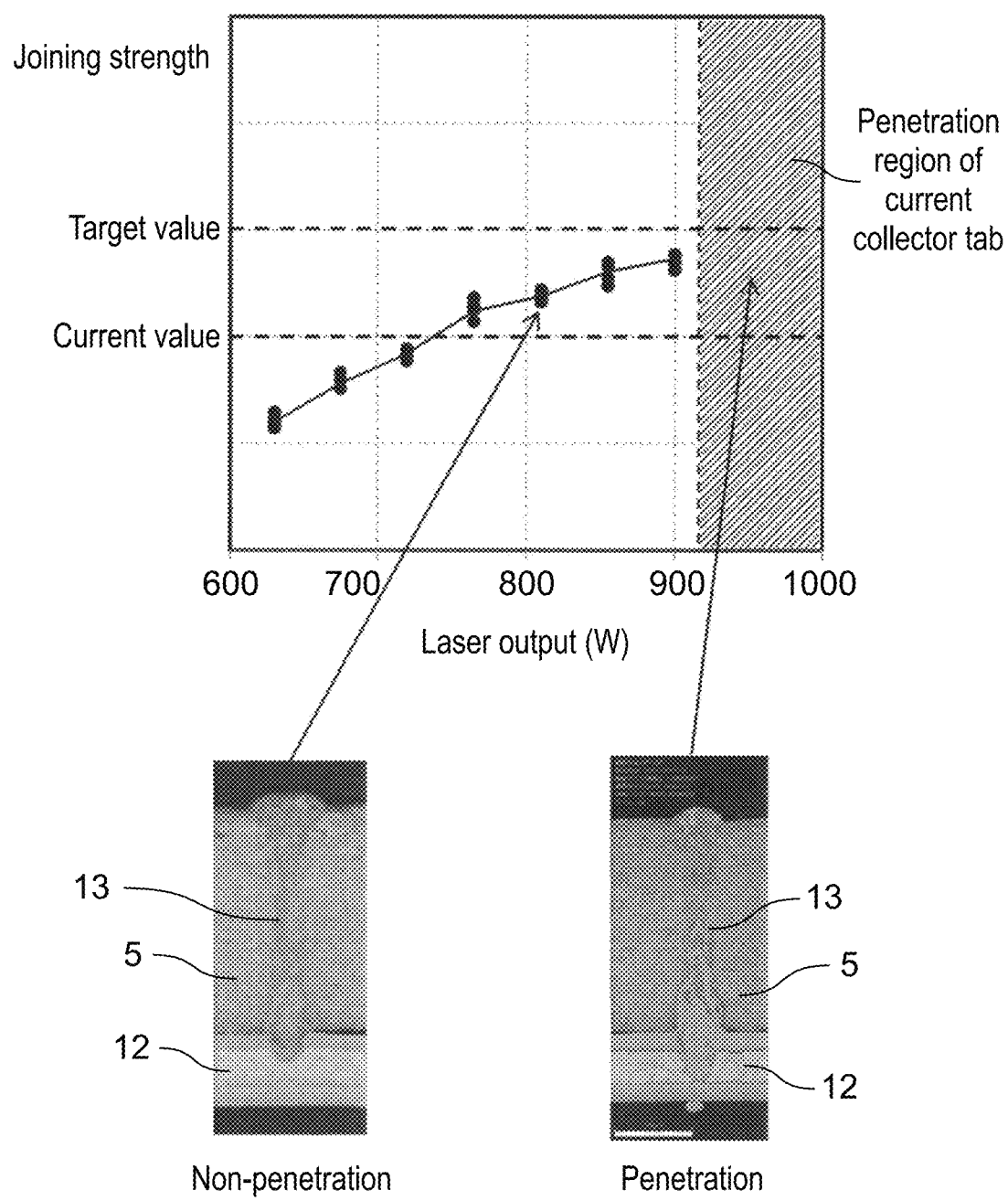
FIG. 2 is a correlation view of a line welding with three lines between a laser output and a joining strength in the related art.

FIG. 2 shows a graph of a correlation relationship between a joining strength and a laser output during a line welding with three lines in the related art. The horizontal axis represents a laser output (W), and the vertical axis represents a joining strength between battery outer case 5 and current collector tab 12. For the sake of explanation, FIG. 2 shows a current value, which is a value of a joining strength currently being obtained, and a target value, which is a target value in which the joining strength is further improved. FIG. 2 shows a penetration region of the current collector tab. The penetration region of the current collector tab is a range of a laser output in which melting portion 13, which is formed by an irradiation using the laser output, penetrates current collector tab 12. When the laser output is increased, the joining strength also increases, but when the laser output is increased excessively, the laser output reaches the penetration region of the current collector tab. In this case, melting portion 13 penetrates current collector tab 12, and a spatter, which is formed by melted current collector tab 12, is mixed inside battery outer case 5, causing a short circuit failure. Therefore, even in a state where the laser output is increased, the target value of the joining strength cannot be achieved.

Figure 3:
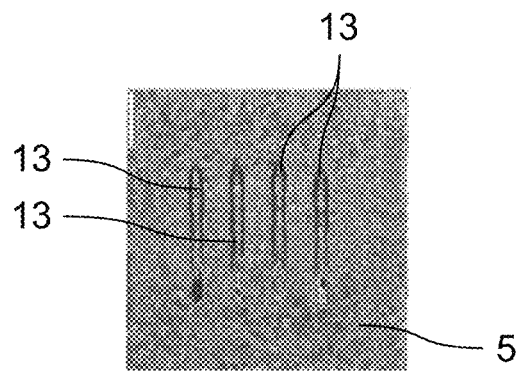
FIG. 3 is an external appearance photograph of a line welding with four lines.

FIG. 3 shows an external appearance photograph of a line welding with four lines, which is used for an examination as an improvement measure for the line welding with three lines. Four line-shaped melting portions 13 are formed along the surface of battery outer case 5.

Figure 4:
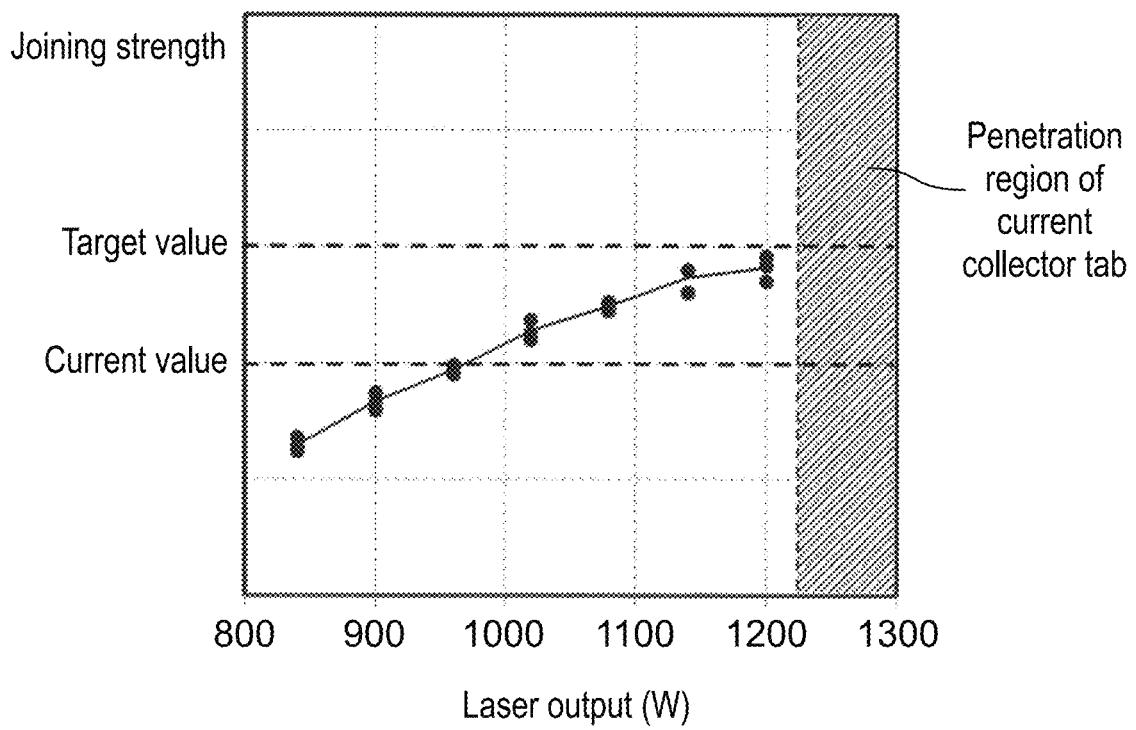
FIG. 4 is a correlation view of a line welding with four lines between a laser output and a joining strength.

FIG. 4 shows a graph of a correlation relationship between a joining strength and a laser output during a line welding with four lines. The horizontal axis represents a laser output (W), and the vertical axis represents a joining strength between battery outer case 5 and current collector tab 12. As shown in FIG. 4, even when line-shaped melting portion 13 is increased to four lines, the maximum joining strength is increased by only substantially 5%, and the target value of the joining strength cannot be achieved.

On the other hand, in order to perform a line welding with five lines at the same time, a laser device capable of implementing a further higher laser output is required. Therefore, it is difficult to achieve a target value of a joining strength between battery outer case 5 and current collector tab 12 by applying the laser processing method in the related art. Therefore, the present inventors have examined the laser processing method of the present disclosure as a laser processing method capable of solving the above-mentioned problems.

An object of the present disclosure is to solve the above-mentioned problems in the related art and to improve a joining strength in a melting portion, which is formed by laser irradiation, without penetrating a plate-shaped member that is farthest from an irradiation surface, in a lap laser welding of two or more plate-shaped members.

The laser processing method of one aspect of the present disclosure includes the following steps. A plurality of plate-shaped members that include a first plate-shaped member disposed on one end side in an overlapping direction and a second plate-shaped member disposed on the other end side, are overlapped. Subsequently, a laser beam is branched into a first branched laser beam and a second branched laser beam. Subsequently, the first plate-shaped member is irradiated with the first branched laser beam and the second branched laser beam in a state where the first branched laser beam and the second branched laser beam are emitted in parallel. Subsequently, line-shaped melting portions are formed along a surface of the first plate-shaped member by relatively moving the first branched laser beam and the second branched laser beam with respect to the first plate-shaped member in a direction intersecting a direction in which the first branched laser beam and the second branched laser beam are aligned. The melting portion formed by the first branched laser beam and the melting portion formed by the second branched laser beam are connected to each other in the second plate-shaped member and the melting portions do not penetrate the second plate-shaped member. Therefore, each of the overlapped plate-shaped members is joined with the line-shaped melting portions.

A gap between the condensed light spots of the branched laser beams may be greater than or equal to the joining width and less than or equal to the melting width in the melting portion that is formed by branched one laser beam.

The laser beam may be branched into a plurality of branched laser beams that include a plurality of pairs of the first branched laser beam and the second branched laser beam. The first plate-shaped member may be irradiated with the branched laser beams in a state where each of the branched laser beams is emitted in parallel. In the first plate-shaped member, a gap between one pair of branched laser beams and another one pair of branched laser beams, which is adjacent to the one pair of branched laser beams, is larger than a gap between the first branched laser beam and the second branched laser beam.

One side of a gap between the condensed light spots of the branched laser beams adjacent to each other is greater than or equal to the joining width and less than or equal to the melting width in the melting portion that is formed by branched one laser beam. The other side may be larger than or equal to the melting width in the melting portion that is formed by branched one laser beam.

The first plate-shaped member may be irradiated with the branched laser beams such that the melting portions, which are formed by the branched laser beams, are point-symmetrical or line-symmetrical with each other with respect to a center position on the surface of the first plate-shaped member.

The second plate-shaped member may be made of a copper-based material that reduces absorption of the laser beam.

A laser processing device according to one aspect of the present disclosure includes a laser oscillator, a laser oscillation controller, a laser branching optical system, a laser processing optical system, a stage, a stage controller, and an overall controller. The laser oscillator performs irradiation of a laser beam. The laser oscillation controller controls an output of the laser beam. The laser branching optical system branches the laser beam into a plurality of branched laser beams. The laser processing optical system irradiates a first plate-shaped member, which is disposed on one end side of an overlapping direction, of overlapped plate-shaped members, which are irradiation targets and include the first plate-shaped member and a second plate-shaped member disposed on the other end side of the overlapping direction, with the branched laser beams, in a state where the branched laser beams are emitted in parallel from each other. The stage relatively moves the overlapped plate-shaped members with respect to the laser beam. The stage controller controls an operation of the stage. The overall controller synchronously controls the stage controller and the laser oscillation controller. Therefore, the overall controller controls the operation of the stage and the irradiation of the branched laser beam. As a result, the overall controller forms line-shaped melting portions along the first plate-shaped member by relatively moving the branched laser beams with respect to the first plate-shaped member in a direction intersecting a direction, in which the branched laser beams are aligned while irradiating the first plate-shaped member with the branched laser beams, and the melting portion formed by one branched laser beam and the melting portion formed by another branched laser beam are connected to each other in the second plate-shaped member, and the melting portions do not penetrate the second plate-shaped member.

The laser branching optical system may include a diffractive optical element (DOE) that branches the laser beam into the plurality of branched laser beams.

A sealed type battery according to one aspect of the present disclosure has a battery outer case and a current collector tab that is overlapped on an inner surface of a bottom surface portion of the battery outer case and is joined to the battery outer case at a melting portion. The current collector tab enters an outer peripheral portion of the melting portion in the battery outer case.

A sealed type battery according to one aspect of the present disclosure has a battery outer case and a current collector tab that is overlapped on an inner surface of a bottom surface portion of the battery outer case and is joined to the battery outer case at a melting portion. The current collector tab enters further toward the battery outer case in an outer peripheral portion surrounding a central portion of the melting portion in the battery outer case than in the central portion.

According to the laser processing method and the laser processing device of the present disclosure, it is possible to improve a joining strength in a melting portion, which is formed by laser irradiation, without penetrating a plate-shaped member that is farthest from an irradiation surface, in a lap laser welding of two or more plate-shaped members.

Hereinafter, the laser processing method and the laser processing device in the method for manufacturing the sealed type battery according to the Exemplary Embodiment will be described in detail with reference to the drawings.

The laser processing method according to the present Exemplary Embodiment is not limited to the sealed type battery according to the following Exemplary Embodiment. That is, in the following, a method for manufacturing a sealed type battery will be described as an example of the laser processing method and the laser processing device. Appropriate changes can be made without departing from the scope of the effect of the present disclosure. Combinations with other exemplary embodiments are possible.

Sealed Type Battery According to Exemplary Embodiment.

First, sealed type battery 100 according to the Exemplary Embodiment will be described in detail.

Figure 5:
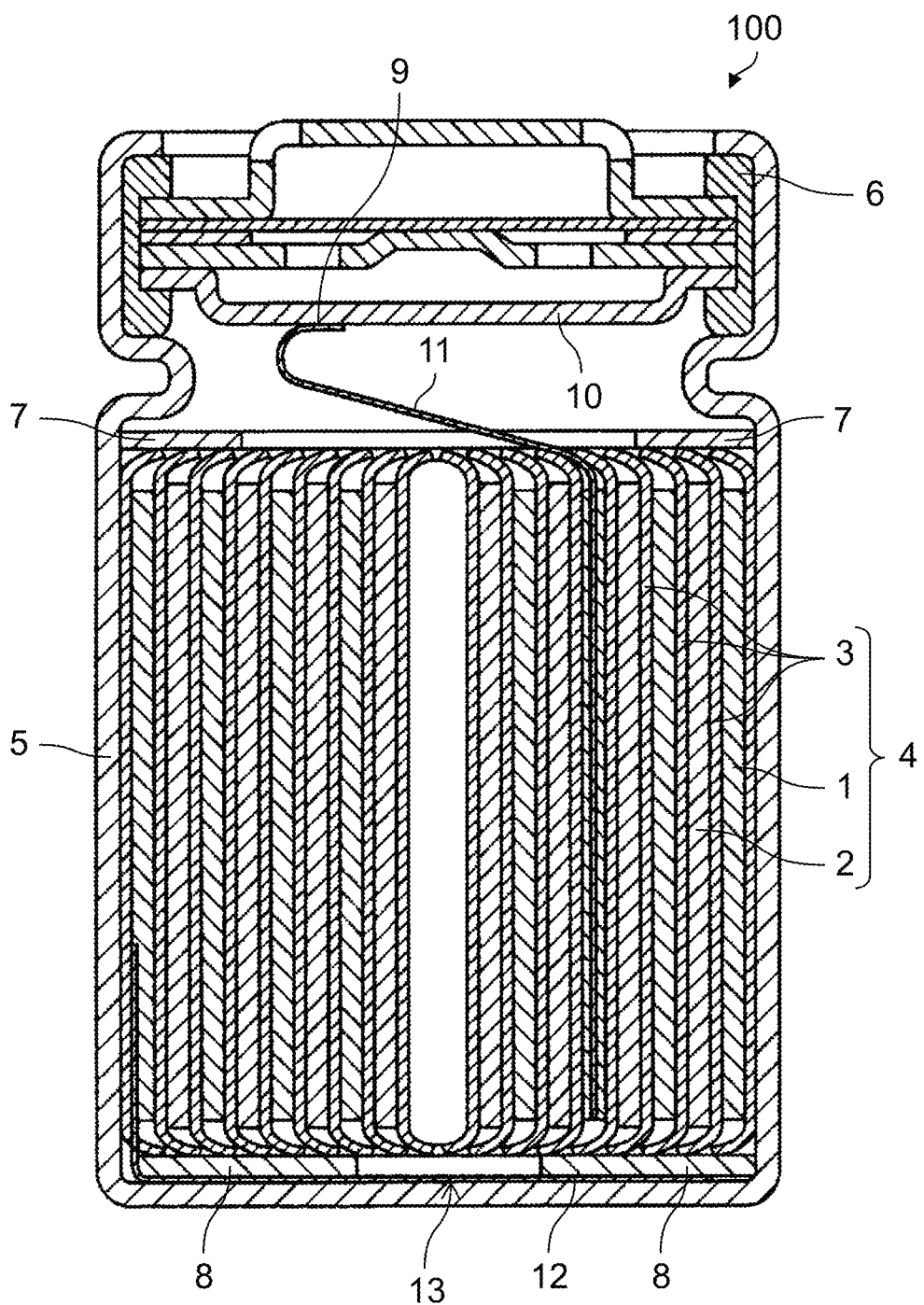
FIG. 5 is a schematic cross-sectional view of a configuration of a sealed type battery according to an Exemplary Embodiment.

FIG. 5 shows a schematic cross-sectional view of a configuration of sealed type battery 100 according to the Exemplary Embodiment. Sealed type battery 100 includes battery outer case 5, gasket 6, sealing plate 10, insulating plate 7, insulating plate 8, winding body 4, positive electrode plate 1, negative electrode plate 2, separator 3, positive electrode current collector tab 11, and negative electrode current collector tab 12. Battery outer case 5 includes an opening. The opening is sealed by sealing plate 10. Gasket 6 is disposed between the opening and sealing plate 10, and sealing plate 10 is fixed to the opening by compressing gasket 6. A plurality of winding bodies 4, insulating plate 7, insulating plate 8, and an electrolytic solution are accommodated in battery outer case 5. Winding body 4 is interposed between insulating plate 7 and insulating plate 8 in battery outer case 5. Winding body 4 includes positive electrode plate 1, negative electrode plate 2, and separator 3, and positive electrode plate 1 and negative electrode plate 2 are wound by separator 3. Positive electrode current collector tab 11 is derived from any one of the electrode plates (for example, positive electrode plate 1) of winding body 4. Negative electrode current collector tab 12 is derived from the other electrode plate (for example, negative electrode plate 2). Melting portion 9 is provided on positive electrode current collector tab 11 and sealing plate 10. Positive electrode current collector tab 11 and sealing plate 10 are joined with melting portion 9. Melting portion 13 is provided in negative electrode current collector tab 12 and battery outer case 5. Negative electrode current collector tab 12 and battery outer case 5 are joined with melting portion 13.

A laser welding in the method for manufacturing sealed type battery 100 will be described below.

First, positive electrode plate 1 and negative electrode plate 2 are wound or laminated by separator 3 to form winding body 4. Subsequently, one end of each of current collector tabs 11 and 12 is connected to each of electrode plates 1 and 2 of winding body 4. Subsequently, winding body 4 is accommodated in battery outer case 5. Subsequently, the other end of current collector tab 12 is overlapped with a bottom surface portion of an inner surface of battery outer case 5. Subsequently, although not shown in FIG. 5, the laser beam is branched into a plurality of branched laser beams. Subsequently, scanning is performed with the branched laser beam over battery outer case 5 while irradiating substantially the center of a bottom surface of the outside of battery outer case 5 with the branched laser beam with a condensed light spot diameter that is smaller than the plate thickness of battery outer case 5. As a result, line-shaped melting portion 13 can be formed in battery outer case 5, and battery outer case 5 and current collector tab 12, which is inside battery outer case 5, can be joined by the laser welding. On the other hand, the other end of current collector tab 11 is overlapped with sealing plate 10, and sealing plate 10 is irradiated in the same manner as battery outer case 5. As a result, line-shaped melting portion 9 is formed on sealing plate 10, and sealing plate 10 and current collector tab 11 can be joined by the laser welding.

Laser Processing Device According to Exemplary Embodiment

Subsequently, laser welding device 200 will be described in detail as an example of the laser processing device according to the Exemplary Embodiment.

Figure 6:
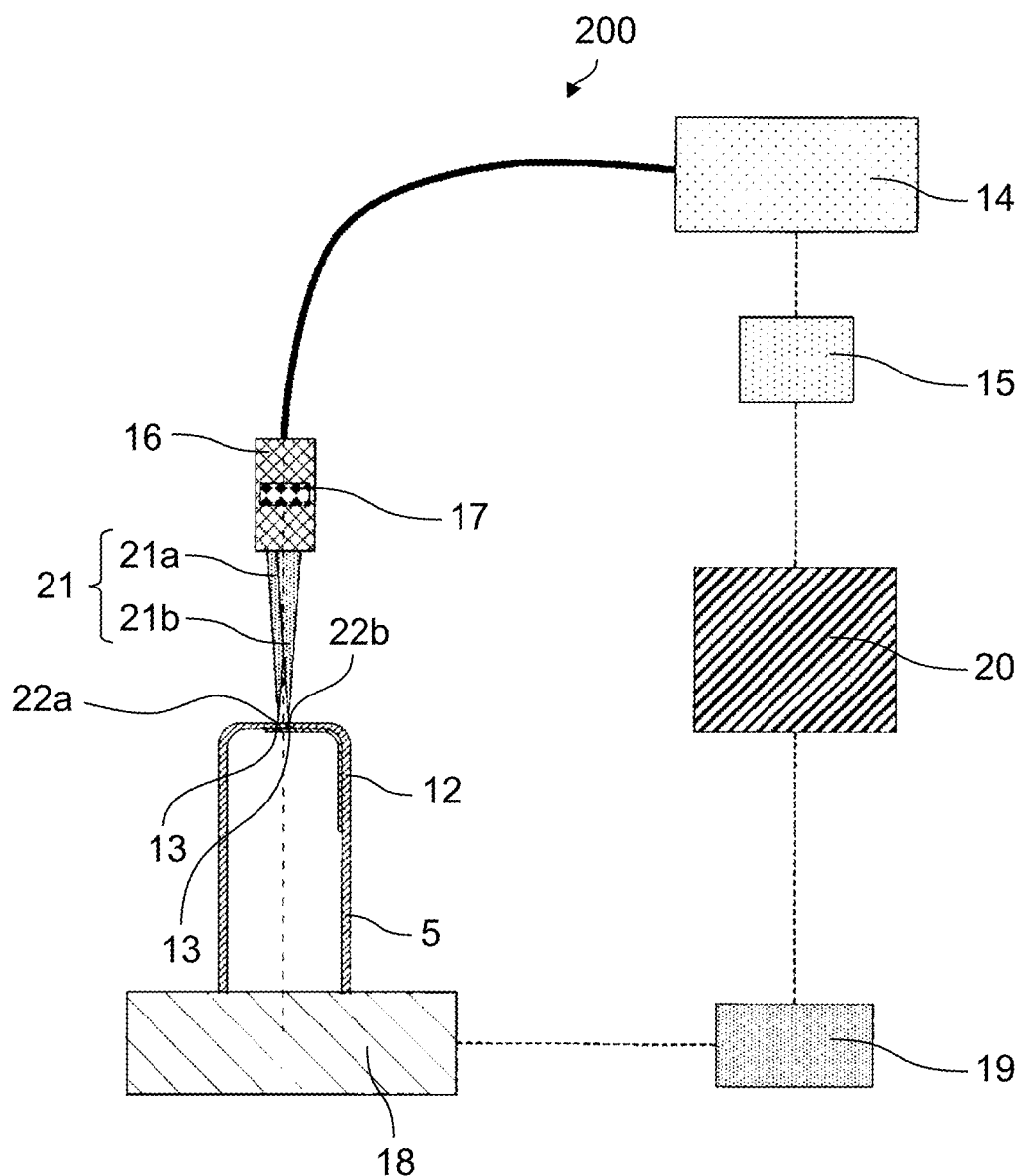
FIG. 6 is a schematic cross-sectional view of a laser welding device according to the Exemplary Embodiment.

FIG. 6 shows laser welding device 200 according to the Exemplary Embodiment. The X and Y directions in FIG. 6 are directions along the bottom surface of battery outer case 5, respectively, and are orthogonal to each other, and the Z direction is a direction in which battery outer case 5 and current collector tab 12 are overlapped with each other, and is a direction orthogonal to the X direction and the Y direction.

As shown in FIG. 6, laser welding device 200 includes laser oscillator 14, laser oscillation controller 15, laser branching optical system 17, laser processing optical system 16, stage 18, stage controller 19, and overall controller 20.

Laser oscillator 14 performs irradiation of laser beam 21. Laser oscillator 14 is, for example, a fiber laser oscillator. Laser oscillator 14 oscillates, for example, a laser having a laser output of 1 kW and a laser wavelength of 1070 nm. Laser oscillator 14 is not limited to such specifications.

Laser oscillation controller 15 controls the irradiation of laser beam 21 (ON/OFF), which is applied from laser oscillator 14, and the output of laser beam 21. By controlling the output, it is possible to apply laser beam 21 having the output required to melt battery outer case 5 and current collector tab 12. For example, by controlling the output of laser oscillation controller 15, battery outer case 5 and current collector tab 12 can melt, and formed melting portion 13 can be irradiated so as not to penetrate current collector tab 12.

Laser beam 21 applied from laser oscillator 14 is incident on laser branching optical system 17, and laser beam 21 is branched into two or more branched laser beams by an optical system of laser branching optical system 17. FIG. 6 shows a case where laser beam 21 is branched into two branched laser beams 21a and 21b by laser branching optical system 17. The branched laser beams 21a and 21b are arranged in the Y direction. In laser branching optical system 17, laser beam 21 may be branched by using a diffractive optical element (DOE). For example, by designing a branching pattern of the diffractive optical element (DOE), laser beam 21 can be branched at any position with any strength. Laser branching optical system 17 is built in laser processing optical system 16.

Laser beam 21 that is applied from laser oscillator 14 is incident on laser processing optical system 16 through an optical fiber. Laser beam 21 is branched into branched laser beams 21a and 21b by laser branching optical system 17 that is built in laser processing optical system 16. Laser processing optical system 16 condenses branched laser beams 21a and 21b and irradiates battery outer case 5 with branched laser beams 21a and 21b, in a state where branched laser beams 21a and 21b are emitted in parallel. In FIG. 6, branched laser beams 21a and 21b are arranged in the Y direction and are applied in the Z direction. Condensed light spots 22a and 22b formed on the bottom surface of battery outer case 5 by branched laser beams 21a and 21b are also arranged in the Y direction. For example, laser processing optical system 16 can condense the condensed light spots of branched laser beams 21a and 21b to be less than or equal to the plate thickness (thickness of the cross section in the Z direction) of battery outer case 5. For example, laser processing optical system 16 can irradiate an approximately center position of substantially the center of the bottom surface of the outside of battery outer case 5 with branched laser beams 21a and 21b. When laser beam 21 is branched into three or more branched laser beams by laser branching optical system 17, laser processing optical system 16 can apply branched laser beams such that the condensed light spot of each of the branched laser beams is on the same straight line in the Y direction.

An irradiation target is mounted on and moved by stage 18. As shown in FIG. 6, for example, battery outer case 5 and current collector tab 12 are mounted on stage 18, and battery outer case 5 and current collector tab 12 are moved in the X direction.

Stage controller 19 controls an operation of stage 18. Stage controller 19 can control, for example, a movement distance, a movement speed, and a timing of a movement start of stage 18.

Overall controller 20 synchronously controls stage controller 19 and laser oscillation controller 15. Therefore, overall controller 20 controls the operation of stage 18 and the outputs of branched laser beams 21a and 21b. While applying branched laser beams 21a and 21b, stage 18 allows battery outer case 5 and current collector tab 12 to be moved with respect to laser processing optical system 16 in a direction orthogonal as a direction that intersects a direction in which branched laser beams 21a and 21b are aligned. The direction in which branched laser beams 21a and 21b are aligned means a direction on a straight line that connects condensed light spots 22a and 22b formed on the bottom surface of battery outer case 5. As shown in FIG. 6, in the present Exemplary Embodiment, branched laser beams 21a and 21b are arranged in the Y direction, and sealed type battery 100 is moved in the X direction by stage 18. As a result, branched laser beams 21a and 21b form line-shaped melting portions 13 along battery outer case 5 in the X direction, melting portions 13 are connected to each other at current collector tab 12, and melting portions 13 do not penetrate current collector tab 12. Battery outer case 5 and current collector tab 12 are joined with line-shaped melting portions 13.

In the above description, the case where the irradiation targets of laser welding device 200 are battery outer case 5 and current collector tab 12 of sealed type battery 100 is described, but the irradiation target is not limited to this. For example, a plurality of plate-shaped members may be overlapped to form an irradiation target. The shape of the plate-shaped member is not limited to that which is flat as a whole. Any member may be used as long as the member spreads in the plane direction orthogonal to the thickness direction of the member and any member may be used as long as the members can be overlapped with each other in a region to be irradiated. For example, plate-shaped members are disposed with an overlapped manner on a disk-shaped end surface of a cylinder, and the cylinder and the plate-shaped members may be defined as irradiation targets. One plate-shaped member may have a plurality of layers such as a clad material or a laminated material.

In the above description, laser branching optical system 17 branches laser beam 21 into two branched laser beams 21a and 21b, but the present disclosure is not limited to this case. Laser beam 21 may be branched into two or more, for example, four branched laser beams.

The moving element in laser welding device 200 is not limited to stage 18, and laser processing optical system 16 may be moved with respect to, for example, stationary stage 18. For example, both stage 18 and laser processing optical system 16 may be relatively moved with respect to each other. The movement is not limited to the movement in the uniaxial direction and may be, for example, a movement in the XY plane.

In the above description, the direction in which branched laser beams 21a and 21b are aligned and the direction in which battery outer case 5 and current collector tab 12 are moved are orthogonal to each other, but the present disclosure is not limited to this case. Branched laser beams 21a and 21b may be relatively moved with respect to battery outer case 5 and current collector tab 12 in a direction intersecting the direction in which branched laser beams 21a and 21b are aligned. For example, battery outer case 5 or the like may be moved in a direction having an angle other than 90° with respect to the Y direction in which branched laser beams 21a and 21b are aligned.

Laser Processing Method According to Exemplary Embodiment

Subsequently, the laser processing method according to the Exemplary Embodiment will be described in detail.

The laser processing method according to the present Exemplary Embodiment includes the following steps. A plurality of plate-shaped members that include a first plate-shaped member disposed on one end side in an overlapping direction and a second plate-shaped member disposed on the other end side, are overlapped. Subsequently, a laser beam is branched into a first branched laser beam and a second branched laser beam. Subsequently, the first plate-shaped member is irradiated with the first branched laser beam and the second branched laser beam in a state where the first branched laser beam and the second branched laser beam are emitted in parallel. Subsequently, line-shaped melting portions are formed along a surface of the first plate-shaped member by relatively moving the first branched laser beam and the second branched laser beam with respect to the first plate-shaped member in a direction intersecting a direction in which the first branched laser beam and the second branched laser beam are aligned. The melting portion formed by the first branched laser beam and the melting portion formed by the second branched laser beam are connected to each other in the second plate-shaped member and the melting portions do not penetrate the second plate-shaped member. Therefore, each of the overlapped plate-shaped members is joined with the line-shaped melting portions.

In the present Exemplary Embodiment, the bottom portion of battery outer case 5 corresponds to the first plate-shaped member, and current collector tab 12 corresponds to the second plate-shaped member. The laser processing method is performed by laser welding device 200. Laser beam 21 is branched by laser branching optical system 17, battery outer case 5 is irradiated by laser processing optical system 16, and battery outer case 5 and current collector tab 12 are moved with respect to laser beam 21 by overall controller 20. The present Exemplary Embodiment will be described below.

Branching of Laser Beam

Figure 7:
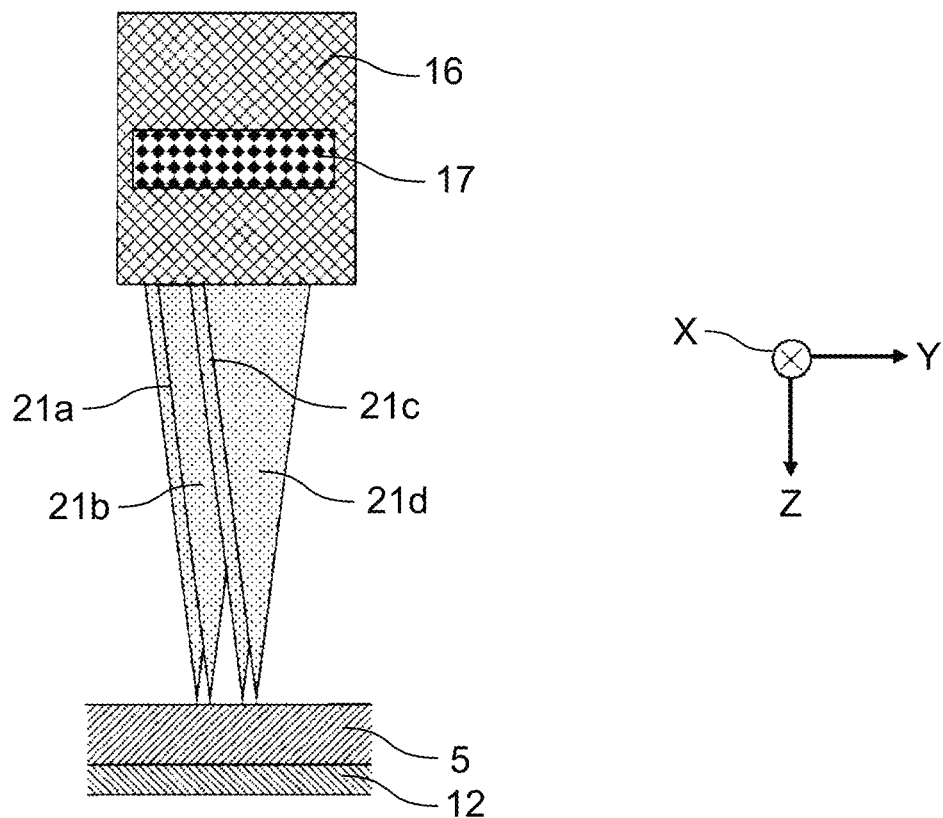
FIG. 7 is a schematic cross-sectional view of a laser processing optical system of the laser welding device according to the Exemplary Embodiment.
Figure 8:
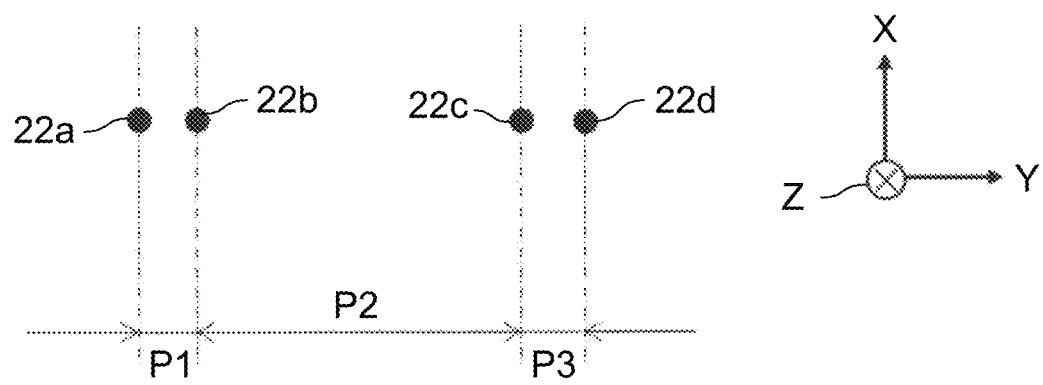
FIG. 8 is a schematic view of a condensed light spot of a branched laser beam.

First, the branching of the laser beam will be described in detail with reference to FIGS. 7 and 8. FIG. 7 shows a schematic cross-sectional view of laser processing optical system 16 of laser welding device 200 according to the Exemplary Embodiment. FIG. 8 shows a schematic view of the condensed light spots of branched laser beams 21a to 21d.

FIG. 7 shows a detailed view of the vicinity of laser processing optical system 16 in laser welding device 200. In FIG. 7, laser beam 21 is incident on laser processing optical system 16 and is branched into four branched laser beams 21a to 21d by laser branching optical system 17. Battery outer case 5 is irradiated in the Z direction in a state where branched laser beams 21a to 21d are arranged in the Y direction.

FIG. 8 shows condensed light spots 22a to 22d of branched laser beams 21a to 21d. Branched laser beams 21a to 21d are condensed by laser processing optical system 16 on four condensed light spots 22a to 22d having condensed light spot diameter φ of 20 μm, respectively. Condensed light spots 22a to 22d are on the same straight line in the Y direction. The laser beam strengths of respective condensed light spots 22a to 22d are equal. In the present Exemplary Embodiment, battery outer case 5 and current collector tab 12 are moved with respect to branched laser beams 21a to 21d in the X direction orthogonal to the Y direction in which condensed light spots 22a to 22d are arranged.

As shown in FIG. 8, a spot pitch between condensed light spot 22a and condensed light spot 22b is defined as P1, a spot pitch between condensed light spot 22b and condensed light spot 22c is defined as P2, and a spot pitch between condensed light spot 22c and condensed light spot 22d is defined as P3. Spot pitch P1 and spot pitch P3 are equal. On the other hand, spot pitch P1 and spot pitch P3 are less than spot pitch P2. In the present Exemplary Embodiment, P1 and P3 are 100 μm, P2 is 800 μm, and the total width (P1+P2+P3) is 1 mm.

Branched laser beam 21a and branched laser beam 21b, which are adjacent with each other at narrow spot pitch P1, form one pair of branched laser beams. Similarly, branched laser beam 21c and branched laser beam 21d, which are adjacent with each other at narrow spot pitch P3, form the other one pair of branched laser beams. That is, the four branched laser beams form two pairs (a pair of 21a and 21b and a pair of 21c and 21d). Spot pitch P2, which is a gap between one pair and the other pair, is set to be larger than a spot pitch (for example, spot pitch P1 or P3) between the branched laser beams in one pair. The gap between one pair and the other pair is the minimum distance between one pair of branched laser beams and the other pair of branched laser beams.

Hereinafter, one pair of branched laser beams 21a and 21b will be described in detail. In the following description, one pair of branched laser beams may be referred to as first branched laser beam 21a and second branched laser beam 21b. The description related to one pair of branched laser beams 21a and 21b can also be applied to the other pair of branched laser beams 21c and 21d.

Laser Welding by Using Two Branched Laser Beams

Figure 9A:
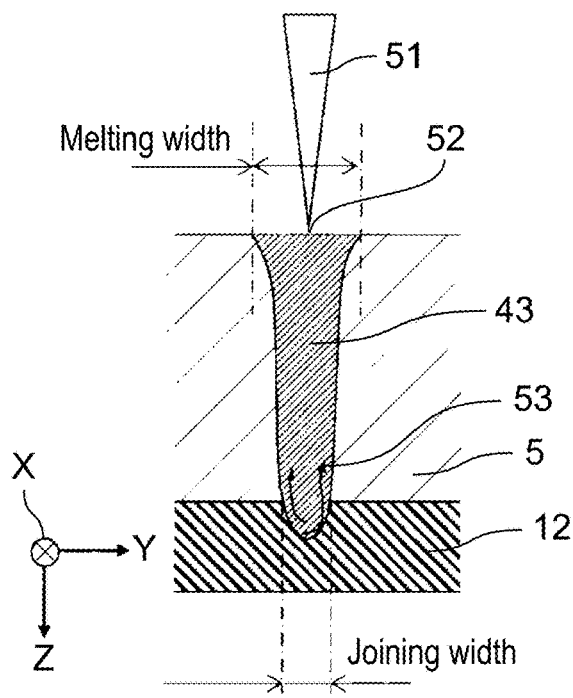
FIG. 9A is a cross-sectional view of melting after a laser welding by using one branched laser beam according to Comparative Example 1.
Figure 9B:
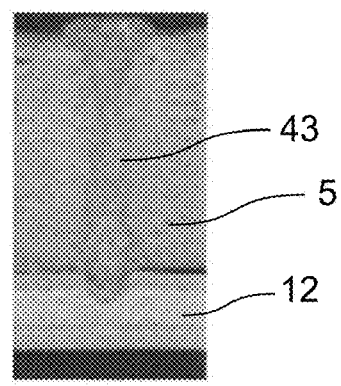
FIG. 9B is a cross-sectional view of melting after the laser welding by using one branched laser beam according to Comparative Example 1.
Figure 10A:
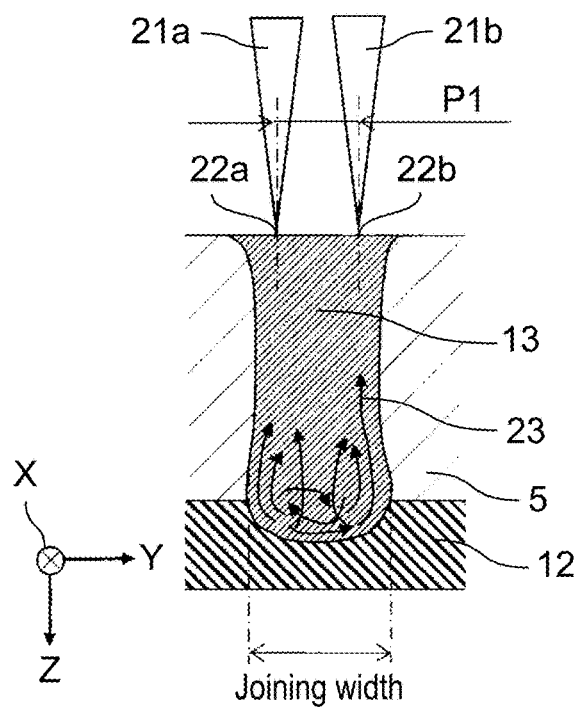
FIG. 10A is a cross-sectional view of melting after the laser welding by using two branched laser beams according to the Exemplary Embodiment.
Figure 10B:
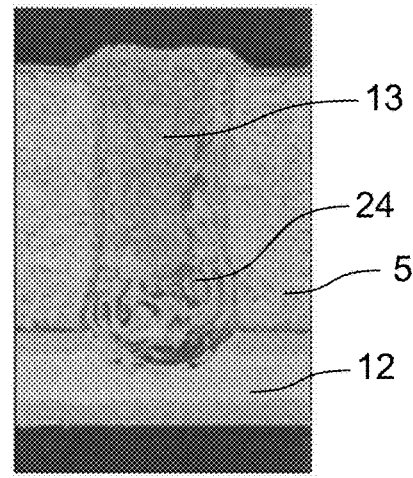
FIG. 10B is a cross-sectional view of melting after the laser welding by using two branched laser beams according to the Exemplary Embodiment.

Laser beam 21 is branched at spot pitch P1 and a laser welding is performed at the same time by using the pair of first branched laser beam 21a and second branched laser beam 21b. A method of performing the laser welding will be described in detail with reference to FIGS. 9A, 9B, 10A, and 10B. FIG. 9A shows a cross-sectional view of melting after a laser welding by using one laser beam 51 as Comparative Example 1. FIG. 9B shows a photograph of an actual cross-sectional view of FIG. 9A. FIG. 10A shows a cross-sectional view of melting after a laser welding by using two branched laser beams 21a and 21b in the present Exemplary Embodiment. FIG. 10B shows a photograph of an actual cross-sectional view of FIG. 10A.

In Comparative Example 1 shown in FIGS. 9A and 9B, the plate thickness of battery outer case 5 is 300 μm, and the plate thickness of current collector tab 12 is 100 μm. Laser beam 51 is condensed at condensed light spot 52 with condensed light spot diameter φ of 20 μm. An upper surface of battery outer case 5 on the drawing is irradiated with laser beam 51 in the Z direction as an irradiation surface of laser beam 51. By a keyhole laser welding, battery outer case 5 and current collector tab 12 are melted, and melting portion 43 is formed in battery outer case 5 and current collector tab 12. In melting portion 43, melting flow 53 directed in the negative direction in the Z direction is generated, and melted battery outer case 5 and melted current collector tab 12 are mixed. Under an appropriate laser condition, the laser welding can be performed without melting portion 43 penetrating current collector tab 12. The width of melting portion 43 on the irradiation surface of battery outer case 5 (hereinafter, the melting width) is 120 μm. The width of melting portion 43 at the boundary between current collector tab 12 and battery outer case 5 adjacent to current collector tab 12 (hereinafter, the joining width) is 50 μm.

In the Exemplary Embodiment shown in FIG. 10A, similar to Comparative Example 1, the plate thickness of battery outer case 5 is 300 μm, and the plate thickness of current collector tab 12 is 100 μm. On the other hand, laser beam 21 is branched into first branched laser beam 21a and second branched laser beam 21b, which are arranged in the Y direction, and is condensed at each of condensed light spots 22*a* and 22*b* with condensed light spot diameter φ of 20 μm. Condensed light spot diameter φ of 20 μm is smaller than the plate thickness of battery outer case 5 of 300 μm. Spot pitch P1 between condensed light spot 22*a* and condensed light spot 22*b* is 100 μm.

By irradiating battery outer case 5 in the Z direction in a state where two branched laser beams 21*a* and 21*b* are arranged in the Y direction, battery outer case 5 and current collector tab 12 are melted. Melting portion 13, which is connected between current collector tab 12 and the boundary of current collector tab 12 and battery outer case 5, is formed. Due to the simultaneous irradiation of branched laser beams 21*a* and 21*b*, the temperature of melting portion 13 becomes higher than the temperature of melting portion 43 in FIG. 9A. The melting volume of melting portion 13 is larger than the melting volume of melting portion 43 in FIG. 9A. The melting volume is the volume of melting portion 13 or melting portion 43. In melting portion 13, turbulent melting flow 23 is generated in the negative direction in the Z direction, the positive or negative direction in the Y direction, and the positive or negative direction in the X direction. Since the temperature of melting portion 13 is high and the melting volume of melting portion 13 is large, melting flow 23 becomes larger than melting portion flow 53 in FIG. 9A, and the region where melting flow 23 is generated is also widened. Melted battery outer case 5 and melted current collector tab 12 are mixed by melting flow 23. Therefore, the joining width of melting portion 13 in current collector tab 12 is expanded. The joining width of melting portion 13 is 150 μm, which is three times the joining width of Comparative Example 1. When the joining width is increased, the joining strength between battery outer case 5 and current collector tab 12 is improved. Therefore, the joining strength is improved by applying two branched laser beams 21*a* and 21*b* rather than one laser beam 21.

On the other hand, as in Comparative Example 1, melting portion 13 does not penetrate current collector tab 12. Therefore, it is possible to prevent the spatter, which is formed by melted current collector tab 12, from being mixed into the space inside battery outer case 5. Therefore, the short circuit failure of sealed type battery 100 can be reduced.

As shown in FIG. 10B, as a result of melting flow 23, a part of current collector tab 12 diffuses into battery outer case 5, and current collector tab diffusion portion 24 is formed.

By forming current collector tab diffusion portion 24, the material constituting current collector tab 12 enters the region of battery outer case 5 from current collector tab 12 at the outer peripheral portion of melting portion 13. For example, current collector tab 12 may be made of a three-layer clad material of nickel, copper, and nickel. In this case, the nickel and/or copper of current collector tab 12 is melted by the laser irradiation and enters the region of battery outer case 5 by melting flow 23. As a result, current collector tab diffusion portion 24 having nickel and/or copper is formed in the region of battery outer case 5. Since the material constituting current collector tab 12 has high electrical conductivity, the conductivity of battery outer case 5 in melting portion 13 is improved. Therefore, in sealed type battery 100, the current flow from current collector tab 12 to battery outer case 5 is improved.

By forming current collector tab diffusion portion 24, when the material constituting current collector tab 12 enters the region of battery outer case 5 from current collector tab 12, more materials constituting current collector tab 12 enter the outer peripheral portion of melting portion 13 than the central portion of melting portion 13. As a result, current collector tab diffusion portion 24 reaches a greater height in the outer peripheral portion of melting portion 13 in the direction opposite to the Z direction as compared with the central portion of melting portion 13. According to such a configuration, in sealed type battery 100, the current flow from current collector tab 12 to battery outer case 5 is further improved.

Next, the laser welding method will be described in detail with reference to FIGS. 11A to 11D. FIGS. 11A to 11D show cross-sectional views of a laser welding process by using a pair of two branched laser beams 21*a* and 21*b* that have spot pitch P1.

Figure 11A:
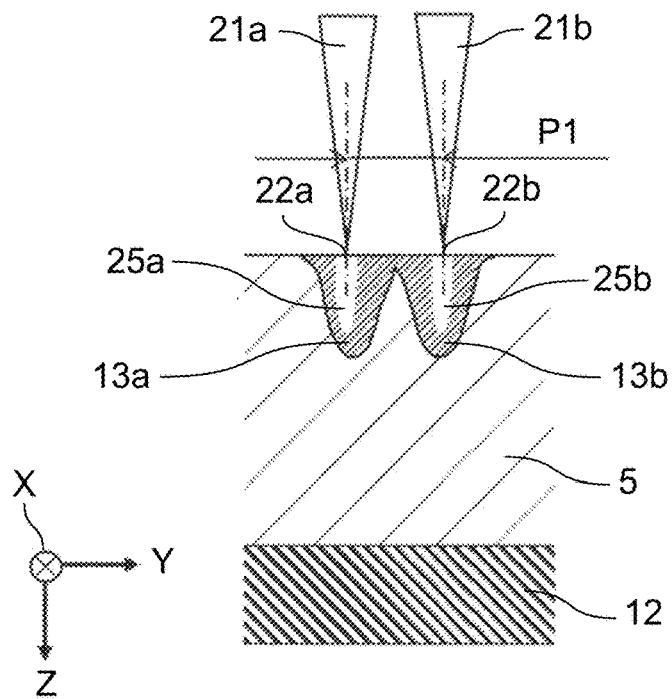
FIG. 11A is a cross-sectional view immediately after the start of irradiation in a laser welding process by using two branched laser beams according to the Exemplary Embodiment.

FIG. 11A shows a cross-sectional view of melting immediately after the irradiation start of first branched laser beam 21*a* and second branched laser beam 21*b*. First branched laser beam 21*a* and second branched laser beam 21*b* are applied in a state where first branched laser beam 21*a* and second branched laser beam 21*b* are emitted in parallel at narrow spot pitch P1. Since condensed light spot diameters φ of first branched laser beam 21*a* and second branched laser beam 21*b* are as small as 20 μm, elongated holes called keyholes 25*a* and 25*b* are formed inside melting portions 13*a* and 13*b*. First branched laser beam 21*a* and second branched laser beam 21*b* propagate in the holes, and melting portions 13*a* and 13*b* grow elongated in the Z direction.

Figure 11B:
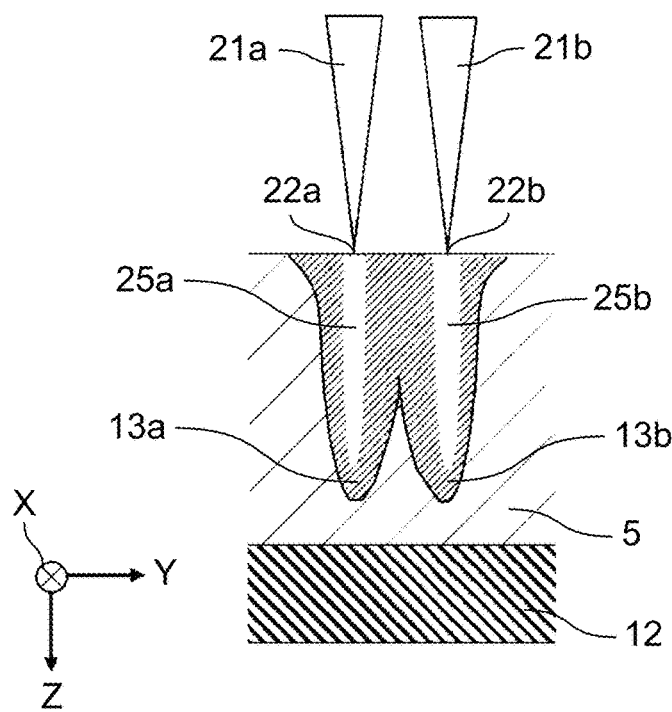
FIG. 11B is a cross-sectional view at the time of a keyhole formation in the laser welding process by using two branched laser beams according to the Exemplary Embodiment.

FIG. 11B shows a cross-sectional view of melting in a state where keyholes 25*a* and 25*b* are further grown in the Z direction. The melting heat is accumulated between melting portion 13*a* and melting portion 13*b*, and the melting efficiency is improved. Therefore, melting portion 13*a* spreads toward the melting portion 13*b* side, and melting portion 13*b* spreads toward the melting portion 13*a* side, and melting portion 13*a* and melting portion 13*b* are connected to each other near the upper surface of battery outer case 5 on the drawing. Regarding the "connecting", it means that melting portion 13*a*, which is formed by branched laser beam 21*a*, and melting portion 13*b*, which is formed by branched laser beam 21*b*, are continuous and there is no boundary therebetween.

Figure 11C:
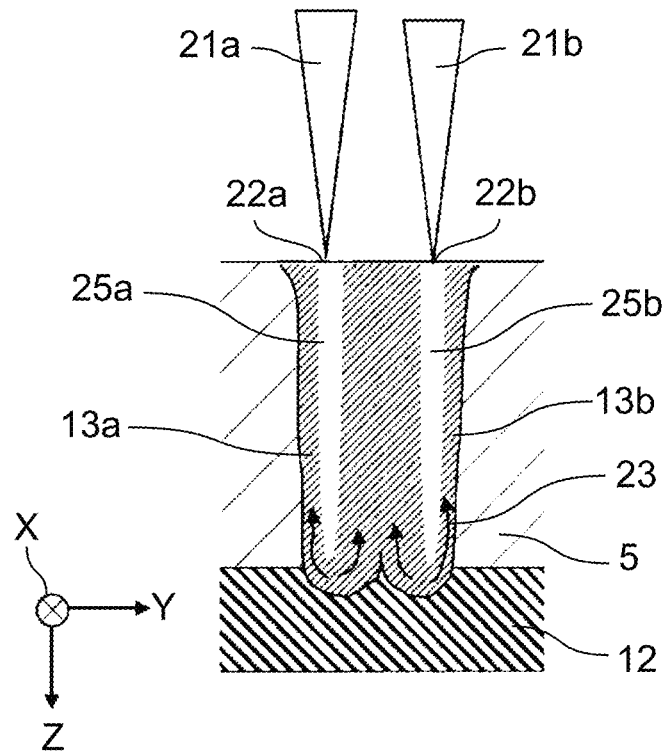
FIG. 11C is a cross-sectional view at the time a front end of a melting portion reaches a current collector tab in the laser welding process by using two branched laser beams according to the Exemplary Embodiment.

FIG. 11C shows a cross-sectional view of melting in a state where the front ends of melting portions 13*a* and 13*b* reach current collector tab 12, respectively. At the front ends of melting portions 13*a* and 13*b*, a turbulent melting flow 23 is generated in the negative direction of the Z direction and in the positive or negative direction of the Y direction, and melted battery outer case 5 and melted current collector tab 12 are mixed. Therefore, melting portion 13*a* and melting portion 13*b* are connected.

Figure 11D:
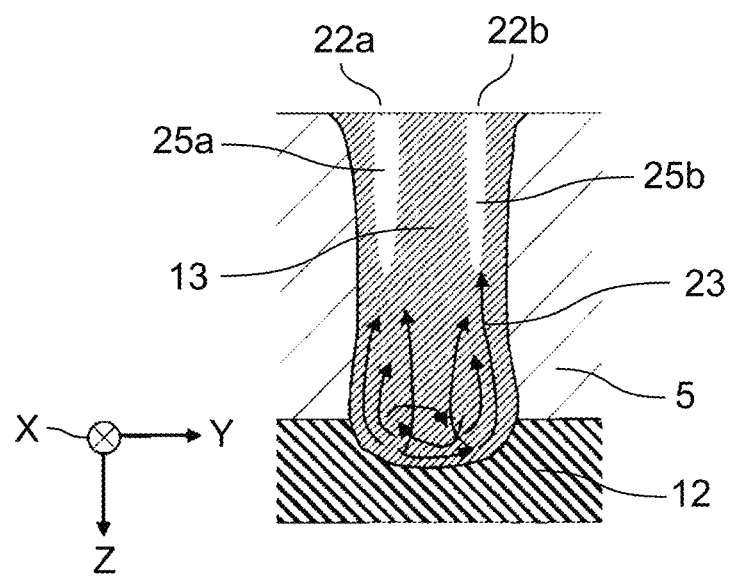
FIG. 11D is a cross-sectional view at the time of a keyhole disappearance in the laser welding process by using two branched laser beams according to the Exemplary Embodiment.

FIG. 11D shows a cross-sectional view of melting in a state where keyholes 25*a* and 25*b* become shallow. The laser irradiation is ended and then keyholes 25*a* and 25*b* become shallow and disappear. When the laser irradiation is ended, the upper surface of battery outer case 5 on the drawing is cooled, and the temperature gradient in melting portions 13*a* and 13*b* becomes large. Therefore, since melting flow 23 in the negative direction of the Z direction becomes stronger, battery outer case 5 and current collector tab 12 are further mixed, and the joining width of melting portions 13*a* and 13*b* in current collector tab 12 can be expanded. Therefore, the joining strength between battery outer case 5 and current collector tab 12 can be improved.

Figure 12A:
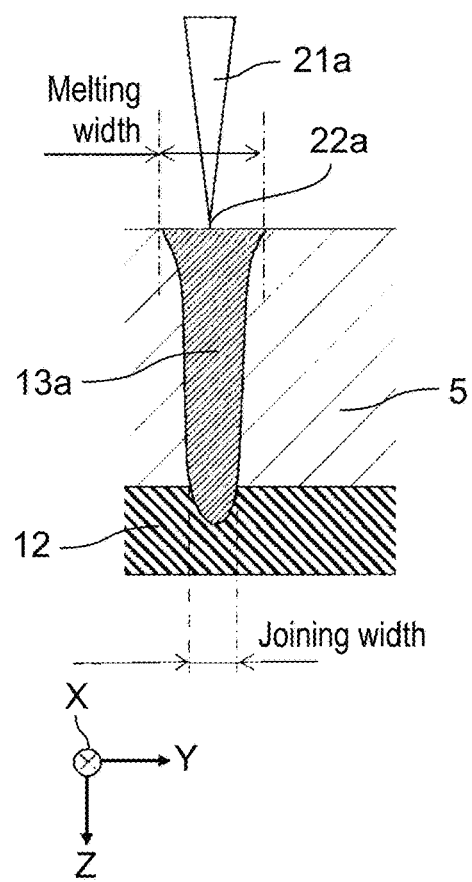
FIG. 12A is a cross-sectional view of a laser welding process by using two non-simultaneous branched laser beams according to Comparative Example 2.
Figure 12B:
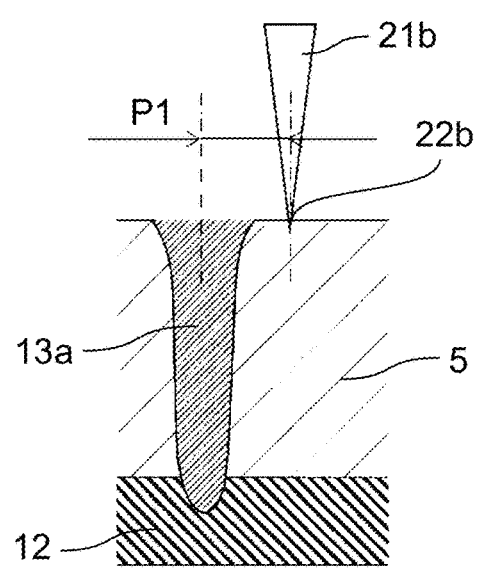
FIG. 12B is a cross-sectional view of the laser welding process by using two non-simultaneous branched laser beams according to Comparative Example 2.

Subsequently, as Comparative Example 2 of the Exemplary Embodiment, a detailed description will be given with reference to FIGS. 12A and 12B showing cross-sectional views of the laser welding process for the case of forming a melting portion by applying the laser beam in order instead of simultaneously.

FIG. 12A shows a cross section of melting after irradiation of first laser beam 21a (referred to as 21a having the same reference numeral in order to relate to the first branched laser beam). Battery outer case 5 is irradiated with single laser beam 21a, and melting portion 13a is formed in battery outer case 5 and current collector tab 12.

Subsequently, as shown in FIG. 12B, battery outer case 5 is irradiated with second laser beam 21b (referred to as 21b having the same reference numeral in order to relate to the second branched laser beam) at a position of condensed light spot 22b, which is 100 μm shifted in the Y direction from first laser beam 21a. When laser beam 21b is applied, melting portion 13a is already solidified. Therefore, melting portion 13b formed by using laser beam 21b is formed independently of melting portion 13a formed by first laser beam 21a.

Figure 12C:
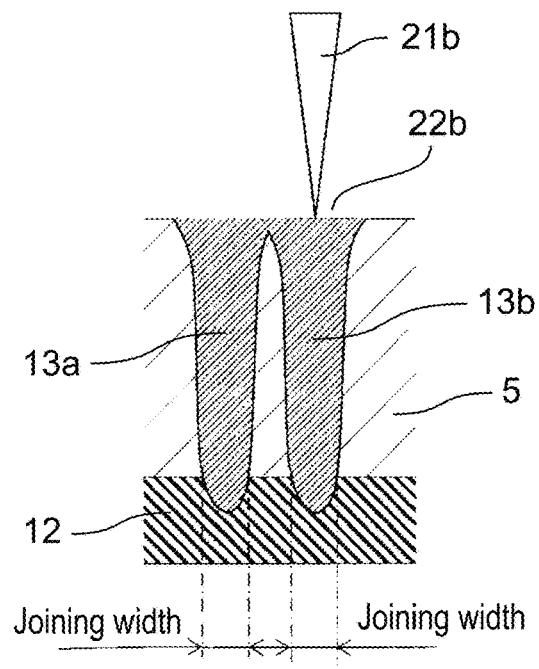
FIG. 12C is a cross-sectional view of the laser welding process by using two non-simultaneous branched laser beams according to Comparative Example 2.

As shown in FIG. 12C, melting portions 13a and 13b are not connected to each other, and melting portions 13a and 13b, which are divided into two, are formed. Since two positions are welded with the joining width of 50 μm, the total joining width becomes 100 μm. Therefore, the joining strength between battery outer case 5 and current collector tab 12 is not improved. Therefore, in order to improve the joining strength between battery outer case 5 and current collector tab 12, it is preferable to apply laser beams 21a and 21b at the same time.

Figure 12D:
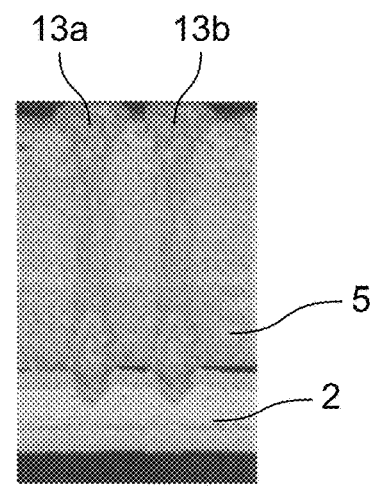
FIG. 12D is a cross-sectional view of the laser welding process by using two non-simultaneous branched laser beams according to Comparative Example 2.

As shown in the cross section of melting shown in FIG. 12D, melting portions 13a and 13b, which are formed by laser beams 21a and 21b, are not connected, and melting portions 13a and 13b, which are divided into two, are formed.

Figure 13A:
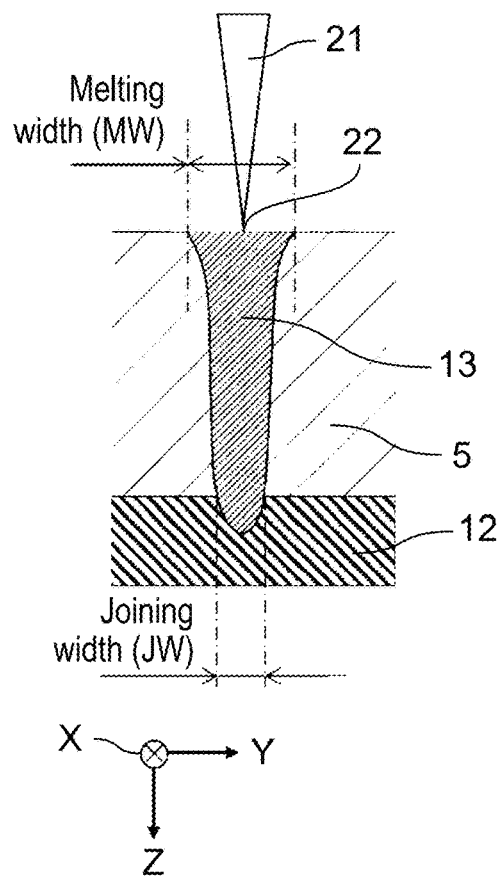
FIG. 13A is a cross-sectional view of melting after a laser welding by using a branched laser beam.
Figure 13B:
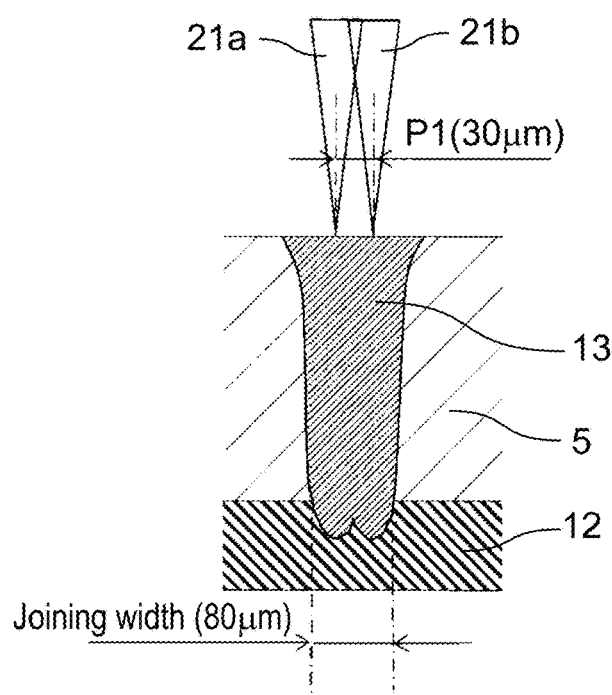
FIG. 13B is a cross-sectional view of melting after a laser welding by using a branched laser beam.
Figure 13C:
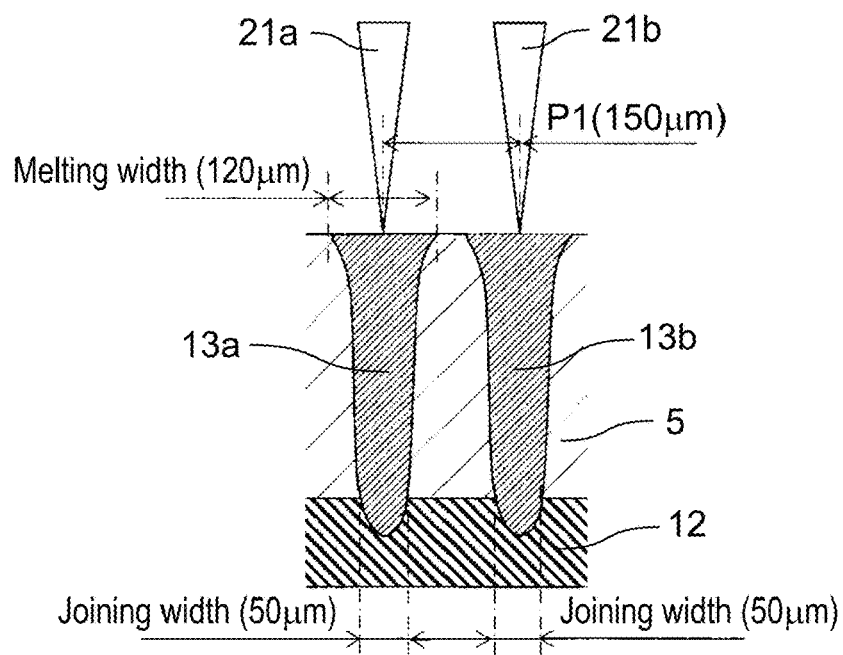
FIG. 13C is a cross-sectional view of melting after a laser welding by using a branched laser beam.

As described above, it is preferable to simultaneously apply two branched laser beams 21a and 21b that are branched at spot pitch P1. Spot pitch P1 will be described in detail with reference to FIGS. 13A to 13C. FIGS. 13A to 13C show cross-sectional views of melting after the laser welding by using a branched laser beam.

FIG. 13A shows single joining width JW and single melting width MW of melting portion 13 formed by one laser beam 21. Single joining width JW of melting portion 13 is a width of melting portion 13 at the boundary between current collector tab 12 and battery outer case 5, which is adjacent to current collector tab 12, in the direction orthogonal to the laser scanning direction. Single melting width MW of melting portion 13 is a width of melting portion 13 on the upper surface of battery outer case 5, which is the irradiation surface, on the drawing in the direction orthogonal to the laser scanning direction. In FIG. 13A, single joining width JW is 50 μm and single melting width MW is 120 μm.

By performing irradiation using two branched laser beams 21a and 21b rather than one laser beam 21, it is possible to improve the joining width with melting portion 13 and the joining strength between battery outer case 5 and current collector tab 12. For example, as shown in FIG. 13B, at spot pitch P1 (for example, 30 μm) having single joining width JW or less, melting portions 13, which are connected by branched laser beams 21a and 21b, are formed. The joining width with melting portion 13 is 80 μm.

For example, as shown in FIG. 13C, at spot pitch P1 (for example, 150 μm) having single melting width MW or more, melting portions 13 are not connected and two melting portions 13a and 13b that remain separated are formed. Since the joining widths of melting portions 13a and 13b are 50 μm each, the total joining width is 100 μm.

Therefore, by setting spot pitch P1 to be greater than or equal to single joining width JW and less than or equal to single melting width MW, melting portions 13 are connected, and the joining width with melting portion 13 and the joining strength between battery outer case 5 and current collector tab 12 can be further improved. For example, as shown in FIG. 10A, the joining width with melting portion 13 is 150 μm.

Laser Welding by Using Four Branched Laser Beams

Next, a laser welding of four branched laser beams 21a to 21d will be described in detail. As shown in FIG. 8 above, branched laser beams 21a to 21d are applied in a state where branched laser beams 21a to 21d are emitted in parallel. FIGS. 14A to 14D show explanatory views of the laser welding process by using four branched laser beams.

Figure 14A:
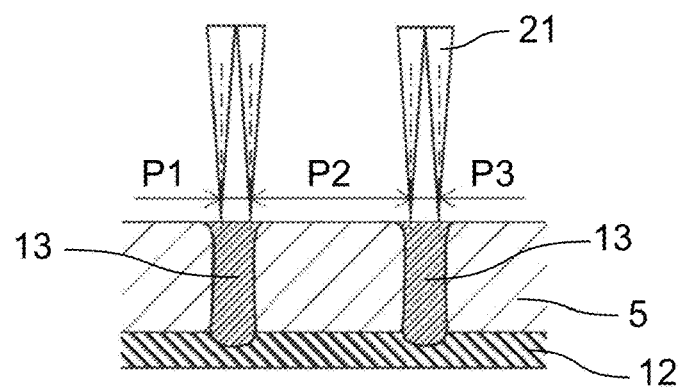
FIG. 14A is an explanatory view of the laser welding process by using four branched laser beams according to the Exemplary Embodiment.

FIG. 14A shows a cross-section model of melting by using the four beams. Four branched laser beams 21a to 21d form two pairs having narrow spot pitches, and a gap between the two pairs is larger than the narrow spot pitch. Therefore, two connected melting portions 13 are obtained at positions separated from each other, and battery outer case 5 and current collector tab 12 are laser welded at two positions. Therefore, the joining strength can be increased.

Figure 14B:
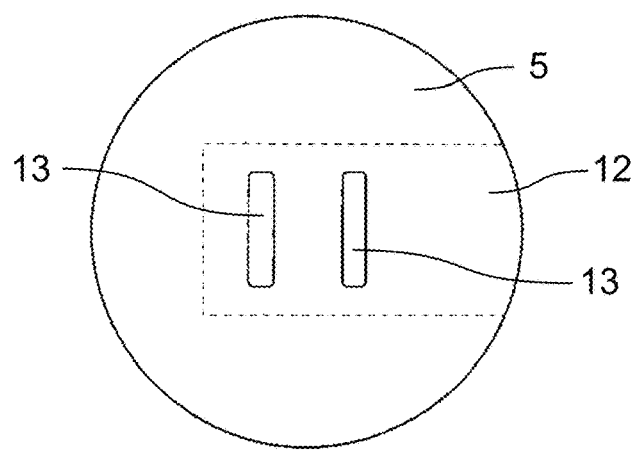
FIG. 14B is an explanatory view of the laser welding process by using four branched laser beams according to the Exemplary Embodiment.

FIG. 14B shows a melting model of an external appearance seen from the bottom surface of battery outer case 5. The joining torque strength can also be increased by performing a welding at a position of point-symmetrical or line-symmetrical with respect to a center position on the surface of battery outer case 5, and by separating the two positions.

Figure 14C:
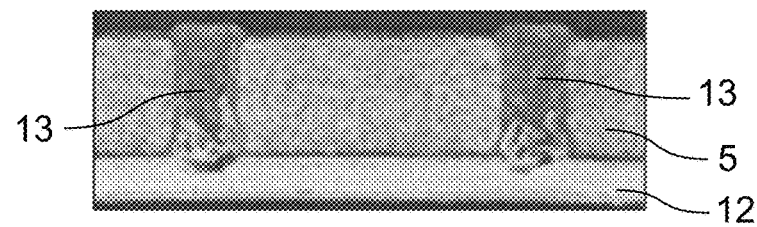
FIG. 14C is an explanatory view of the laser welding process by using four branched laser beams according to the Exemplary Embodiment.
Figure 14D:
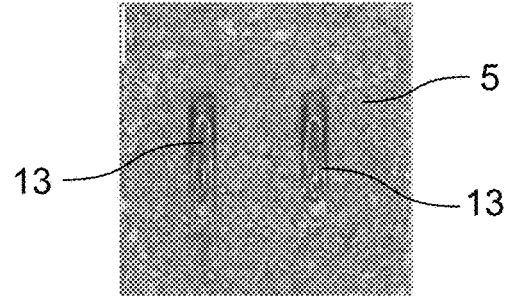
FIG. 14D is an explanatory view of the laser welding process by using four branched laser beams according to the Exemplary Embodiment.

FIG. 14C shows an actual cross-sectional photograph of melting, and FIG. 14D shows an actual external appearance photograph. It can be seen that it is as estimated by the above model. That is, according to the laser processing method related to the present Exemplary Embodiment, the joining width at the boundary between current collector tab 12 and battery outer case 5 can be widened by forming melting portion 13 connected by using one pair of branched laser beams and without melting portion 13 penetrating current collector tab 12.

As described above, four branched laser beams 21a to 21d having narrow spot pitches P1 and P3 and wide spot pitch P2 may be applied. Spot pitches P1 and P3 may be set to be greater than or equal to single joining width JW of melting portion 13 that is formed by one laser beam 21 and set to be less than or equal to single melting width MW that is formed under the same condition. In this case, connected melting portion 13 is formed, and the joining strength between battery outer case 5 and current collector tab 12 can be improved. Spot pitch P2 may be set to be less than or equal to single melting width MW. Therefore, as shown in FIG. 14A, two connected melting portions 13 can be obtained at positions separated from each other, and the joining strength between battery outer case 5 and current collector tab 12 can be further improved.

EXAMPLE

Figure 15:
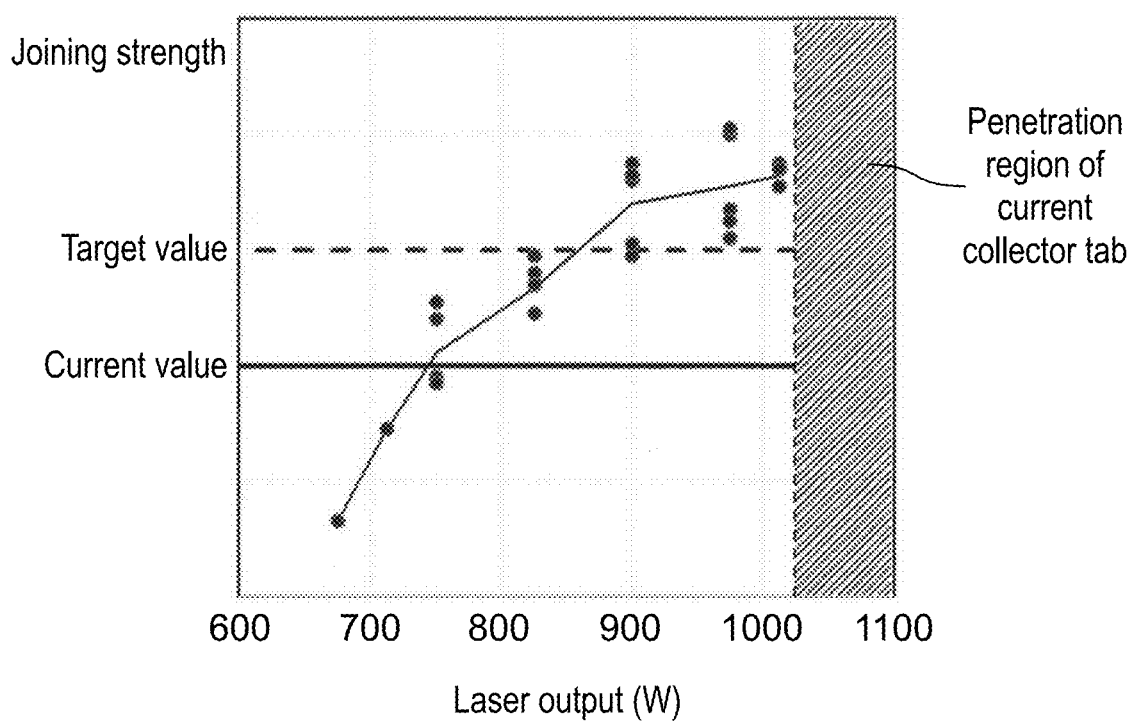
FIG. 15 is a correlation view between the laser output and the joining strength by using four branched laser beams according to an Example.

A joining strength evaluation is performed for sealed type battery 100 that is welded by using the laser processing method according to the Exemplary Embodiment. FIG. 15 shows a graph of a correlation relationship between the joining strength and the laser output. The horizontal axis represents a laser output (W), and the vertical axis represents a joining strength between battery outer case 5 and current collector tab 12. From FIG. 15, it is possible to implement a target value of the joining strength without penetrating current collector tab 12, and it is possible to confirm the effectiveness of the laser processing method according to the present Exemplary Embodiment. Actually, sealed type battery 100 is created by using the laser processing method according to the present Exemplary Embodiment, and then as a result of performing a predetermined drop test with sealed type battery 100 alone and a sealed type battery unit, the normal state is maintained without detaching at the welded portion, and the effectiveness of the laser processing method according to the present Exemplary Embodiment is confirmed.

Material of Current Collector Tab

Materials of current collector tab 12 suitable for the laser processing method according to the present Exemplary Embodiment will be described. Current collector tab 12 made of nickel is commonly used, and has good absorbency for laser beam 21, and is easily melted. However, in the laser processing method according to the present Exemplary Embodiment, it is difficult to perform irradiation so that melting portion 13 does not penetrate current collector tab 12 that has improved absorbency. Therefore, as the material of current collector tab 12, it is preferable to use a material in which the absorption of laser beam 21 is reduced, for example, a material such as copper.

Figure 16A:
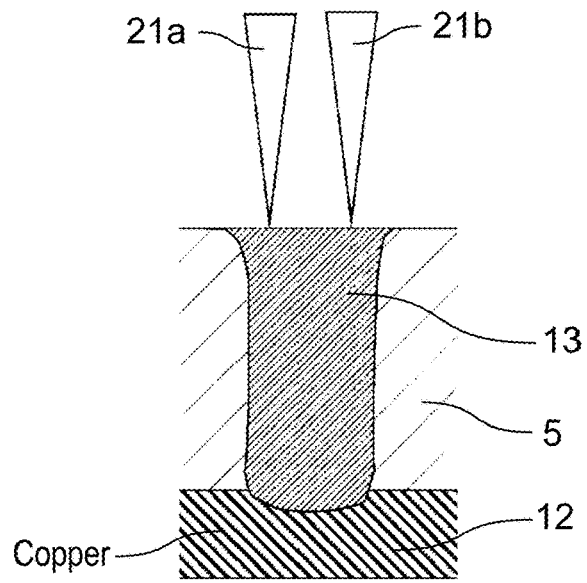
FIG. 16A is a cross-sectional view of the current collector tab suitable for the laser processing method according to the Exemplary Embodiment.
Figure 16B:
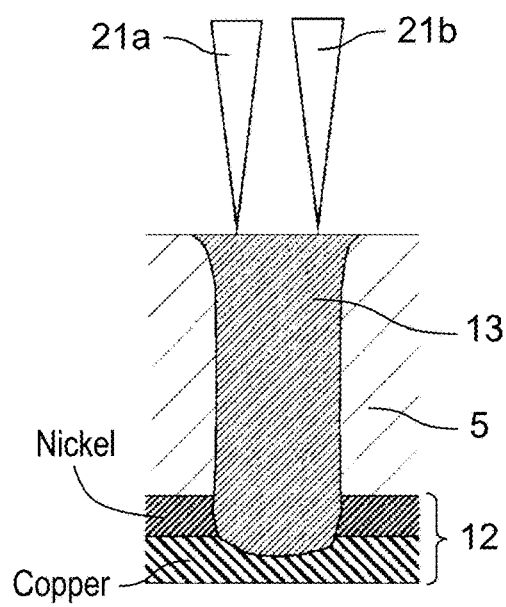
FIG. 16B is a cross-sectional view of the current collector tab suitable for the laser processing method according to the Exemplary Embodiment.
Figure 16C:
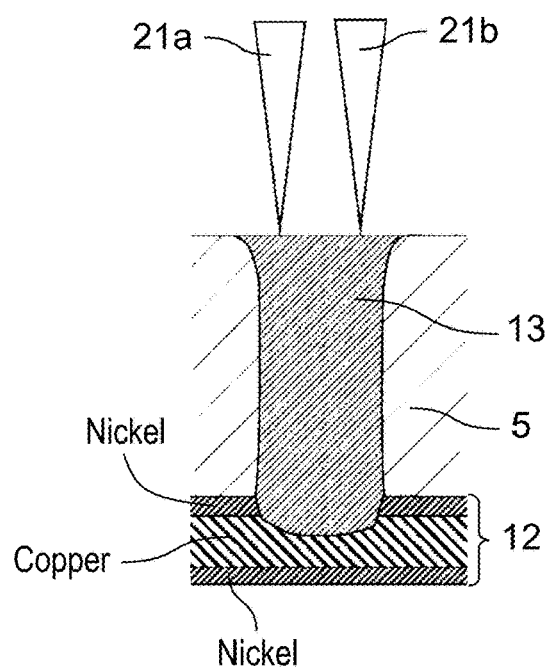
FIG. 16C is a cross-sectional view of the current collector tab suitable for the laser processing method according to the Exemplary Embodiment.
Figure 17A:
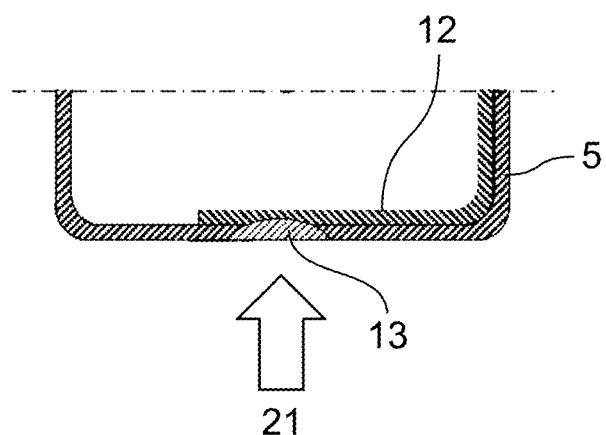
FIG. 17A is a view showing a laser processing method in the related art described in Japanese Patent No. 4547855.
Figure 17B:
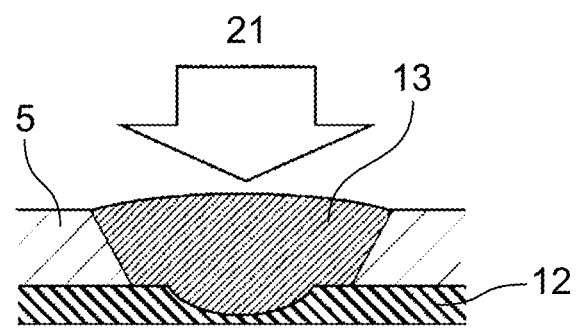
FIG. 17B is a view showing the laser processing method in the related art described in Japanese Patent No. 4547855.
Figure 18A:
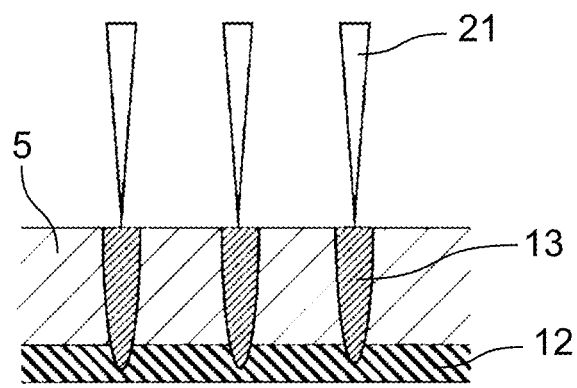
FIG. 18A is a view showing a laser processing method in the related art described in Japanese Patent No. 6512474.
Figure 18B:
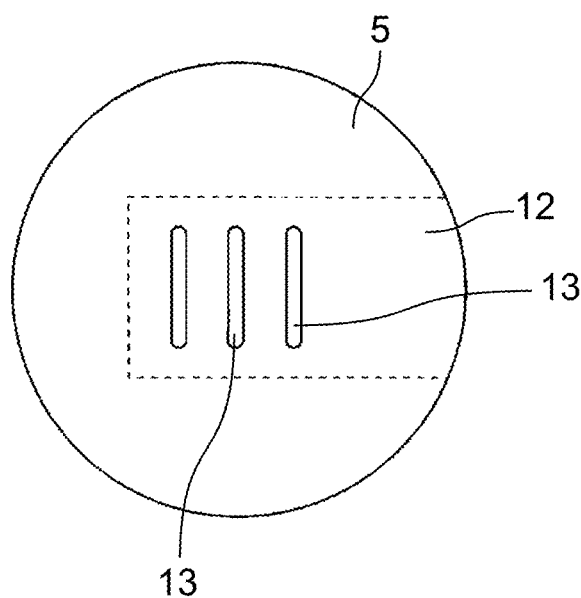
FIG. 18B is a view showing the laser processing method in the related art described in Japanese Patent No. 6512474.

For example, it is preferable to use current collector tab 12 as shown in FIGS. 16A to 16C. The current collector tab in FIG. 16A is made of copper. The current collector tab in FIG. 16B is made of a two-layer clad material of nickel and copper, and the current collector tab in FIG. 16C is made of a three-layer clad material of nickel, copper and nickel. In any case, the laser can be stopped at the copper portion of current collector tab 12 to prevent penetration.

In the above description of the laser processing method, the case where the irradiation targets of the laser beam are battery outer case 5 (an example of a first plate-shaped member) and current collector tab 12 (an example of a second plate-shaped member) in sealed type battery 100 are taken as an example, but the present disclosure is not limited to this. For example, three or more plate-shaped members may be overlapped to form an irradiation target. The shape of the plate-shaped member is not limited to that which is flat as a whole. Any member may be used as long as the member spreads in the plane direction orthogonal to the thickness direction of the member and any member may be used as long as the members can be overlapped with each other in a region to be irradiated. For example, plate-shaped members are disposed with an overlapped manner on a disk-shaped end surface of a cylinder, and the cylinder and the plate-shaped members may be defined as irradiation targets. Another plate-shaped member may be disposed between the first plate-shaped member and the second plate-shaped member. One plate-shaped member may have a plurality of layers such as a clad material or a laminated material. One plate-shaped member may have a plurality of layers such as a clad material or a laminated material.

Effects

According to the laser processing method related to the Exemplary Embodiment, branched laser beams 21*a* and 21*b* are applied in a state where branched laser beams 21*a* and 21*b* are emitted in parallel. Battery outer case 5 is moved with respect to branched laser beams 21*a* and 21*b* in a direction intersecting the direction in which branched laser beams 21*a* and 21*b* are arranged. As a result, line-shaped melting portions 13*a* and 13*b* are formed along the surface of battery outer case 5. Therefore, melting portion 13 can be formed by a laser welding, and joining of battery outer case 5 and current collector tab 12 can be implemented.

Melting portions 13*a* and 13*b* formed by using the two branched laser beams are connected at current collector tab 12. By forming melting portions 13*a* and 13*b* connected at current collector tab 12, the melting volume becomes larger than that in the case of irradiation by using one laser beam 21, and large melting flow 23 is formed. Due to melting flow 23, melted battery outer case 5 and current collector tab 12 are mixed, and the joining width of melting portion 13 at the boundary between current collector tab 12 and battery outer case 5 adjacent to current collector tab 12 can be expanded. Therefore, the joining strength between battery outer case 5 and current collector tab 12 can be improved.

By irradiation of branched laser beams 21*a* and 21*b*, melting portions 13*a* and 13*b* that do not penetrate current collector tab 12 are formed, respectively. Therefore, it is possible to prevent spatter from being mixed into battery outer case 5.

Irradiation may be performed so that spot pitch P1 between first branched laser beam 21*a* and second branched laser beam 21*b* becomes greater than or equal to single joining width JW and less than or equal to single melting width MW. Therefore, melting portions 13*a* and 13*b*, which are formed by using two branched laser beams 21*a* and 21*b*, are connected at current collector tab 12, and the joining width of current collector tab 12 can be further expanded and the joining strength between battery outer case 5 and current collector tab 12 can be further improved.

Laser beam 21 may be branched into a plurality of branched laser beams including a pair of branched laser beams 21*a* and 21*b*. The gap between the pairs may be larger than spot pitch P1 between first branched laser beam 21*a* and second branched laser beam 21*b*. For example, as in spot pitch P2, a gap may be set such that line-shaped melting portions 13, which are formed by the respective pairs, are not connected. Therefore, a plurality of line-shaped melting portions 13 are formed, and the joining strength between battery outer case 5 and current collector tab 12 can be improved.

Spot pitch P1 may be set to greater than or equal to single joining width JW and less than or equal to single melting width MW, and spot pitch P2 may be set to greater than or equal to single melting width MW. For example, melting portions 13, which are connected at current collector tab 12, can be formed by using two branched laser beams 21*a* and 21*b*, and similarly, melting portions 13, which are connected at current collector tab 12, can be formed by using two branched laser beams 21*c* and 21*d* at another separated position. Two connected melting portions 13 are obtained at positions separate from each other. Therefore, the total joining width of current collector tab 12 can be further expanded, and the joining strength between battery outer case 5 and current collector tab 12 can be further improved.

Irradiation may be performed with branched laser beams 21*a* to 21*d* such that the plurality of melting portions 13 formed by irradiation become point-symmetrical or line-symmetrical with respect to the center position on the surface of battery outer case 5. Melting portions 13 may be separated from each other. Therefore, the joining torque strength can be improved.

The material of current collector tab 12 may be made of a copper-based material that reduces the absorption of laser beam 21. Current collector tab 12 does not absorb the energy of laser beam 21, melting can be reduced, and melting portion 13 does not penetrate current collector tab 12. Therefore, it is possible to prevent spatter from being mixed into battery outer case 5.

According to laser welding device 200 related to the Exemplary Embodiment, the operation of stage 18 and the irradiation of branched laser beams 21a to 21d can be controlled by overall controller 20. Specifically, sealed type battery 100 can be moved in a direction intersecting the direction in which branched laser beams 21a to 21d are aligned while applying branched laser beams 21a to 21d. As a result, line-shaped melting portions 13 are formed along battery outer case 5, melting portions 13 are connected at current collector tab 12, and melting portions 13 do not penetrate current collector tab 12. Therefore, the joining width in current collector tab 12 is expanded, the joining strength between battery outer case 5 and current collector tab 12 can be improved, and spatter can be prevented from being mixed into battery outer case 5.

In laser branching optical system 17, laser beam 21 may be branched by using a diffractive optical element (DOE). According to such a configuration, the branching pattern can be designed, and laser beam 21 can be branched into at any position with any strength.

According to sealed type battery 100 of the Exemplary Embodiment, by forming current collector tab diffusion portion 24, the material constituting current collector tab 12 enters the region of battery outer case 5 from current collector tab 12 at the outer peripheral portion of melting portion 13. Since the material constituting current collector tab 12 has high conductivity, the conductivity of battery outer case 5 in melting portion 13 is improved. According to such a configuration, the current flow from current collector tab 12 to battery outer case 5 is improved.

The material constituting current collector tab 12 enters further the region of battery outer case 5 from current collector tab 12 in an outer peripheral portion of melting portion 13 than in a central portion of melting portion 13. According to such a configuration, the current flow from current collector tab 12 to battery outer case 5 is further improved.

In the present Example, the case of the sealed type battery has been described, and for a lap laser welding of two or more plate-shaped materials, it is an effective means when the melting portion formed by welding uses non-penetration welding and the joining strength is further improved.

In winding body 4, the positive electrode plate and the negative electrode plate are not limited to those wound via a separator but may be laminated.

By appropriately combining any of the above-mentioned various exemplary embodiments, the effects of each can be achieved.

The type of a sealed type battery to which the present disclosure can be applied is not particularly limited and can be applied not only to a lithium ion secondary battery but also to a nickel hydrogen battery, a nickel-cadmium battery, or the like. It can be applied not only to a cylindrical secondary battery but also to a square secondary battery or a primary battery.

What is claimed is:

1. A laser processing method comprising:
   overlapping a plurality of plate-shaped members that include a first plate-shaped member disposed on one end side of an overlapping direction and a second plate-shaped member disposed on the other end side of the overlapping direction;
   branching a laser beam into a plurality of branched laser beams that include a plurality of pairs of a first branched laser beam and a second branched laser beam;
   irradiating the first plate-shaped member with the plurality of branched laser beams in a state where the plurality of branched laser beams are emitted in parallel;
   forming line-shaped melting portions along a surface of the first plate-shaped member by relatively moving the first branched laser beam and the second branched laser beam with respect to the first plate-shaped member in a direction intersecting a direction in which the first branched laser beam and the second branched laser beam are aligned; and
   joining each of the overlapped plate-shaped members with the line-shaped melting portions in a state where the melting portion formed by using the first branched laser beam and the melting portion formed by using the second branched laser beam are connected to each other in the second plate-shaped member and the melting portions do not penetrate the second plate-shaped member,
   wherein in the first plate-shaped member, a gap between one pair of branched laser beams and another one pair of branched laser beams, which is adjacent to the one pair of branched laser beams, is larger than a gap between the first branched laser beam and the second branched laser beam.

2. The laser processing method of claim 1, further comprising:
   irradiating the first plate-shaped member with the branched laser beams such that the melting portions, which are formed by using the branched laser beams, are point-symmetrical or line-symmetrical with each other with respect to a center position on the surface of the first plate-shaped member.

3. The laser processing method of claim 1, wherein the second plate-shaped member is made of a copper-based material that reduces absorption of the laser beam.

* * * * *